(12) United States Patent
Deshpande

(10) Patent No.: US 10,547,913 B2
(45) Date of Patent: Jan. 28, 2020

(54) EXTENSIBLE WATERMARK ASSOCIATED INFORMATION RETRIEVAL

(71) Applicant: Sharp Kabushiki Kaisha, Sakai, Osaka (JP)

(72) Inventor: Sachin G. Deshpande, Camas, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/737,782

(22) PCT Filed: Jun. 16, 2016

(86) PCT No.: PCT/JP2016/002909
§ 371 (c)(1),
(2) Date: Dec. 19, 2017

(87) PCT Pub. No.: WO2016/208161
PCT Pub. Date: Dec. 29, 2016

(65) Prior Publication Data
US 2019/0007752 A1   Jan. 3, 2019

Related U.S. Application Data

(60) Provisional application No. 62/182,612, filed on Jun. 21, 2015, provisional application No. 62/200,609, filed on Aug. 3, 2015.

(51) Int. Cl.
*H04N 21/8358* (2011.01)
*H04N 21/81* (2011.01)
*H04N 21/435* (2011.01)

(52) U.S. Cl.
CPC ....... *H04N 21/8358* (2013.01); *H04N 21/435* (2013.01); *H04N 21/812* (2013.01)

(58) Field of Classification Search
CPC ............. H04N 21/812; H04N 21/4331; H04N 21/435; H04N 21/235; G06Q 30/02
See application file for complete search history.

(56) References Cited

U.S. PATENT DOCUMENTS

2006/0136506 A1* 6/2006 Gebhart ................. G06Q 17/30
2014/0059116 A1* 2/2014 Oh .......................... H04L 65/60
709/203

(Continued)

OTHER PUBLICATIONS

Advanced Television Systems Committee, "ATSC Candidate Standard: Interactive Services Standard (A/105:2013)", S13-594r2, Oct. 18, 2013, pp. 1-139.

(Continued)

*Primary Examiner* — Benjamin R Bruckart
*Assistant Examiner* — Anthony Bantamoi
(74) *Attorney, Agent, or Firm* — Keating & Bennett, LLP

(57) ABSTRACT

A method of processing a data stream comprising: (a) receiving said data stream including a watermark message encoded within said data stream; (b) extracting a corresponding recovery file location from said watermark message; (c) receiving a recovery file based upon said recovery file location that includes a corresponding content identifier; (d) selectively extracting said content identifier from said recovery file when said content identifier is an object that includes properties of a pattern expression to express a constraint as a string, where said string is entertainment identifier register information.

2 Claims, 20 Drawing Sheets

(56) References Cited

U.S. PATENT DOCUMENTS

2014/0149836 A1* 5/2014 Bedard ................ G06F 17/246
2015/0379136 A1* 12/2015 Sogani .............. G06F 17/30876
2017/0006315 A1* 1/2017 Giladi ................ H04N 21/2353

OTHER PUBLICATIONS

Deshpande, "Recovery Data With Content Identifiers", U.S. Appl. No. 15/780,667, filed Jun. 1, 2018.

* cited by examiner

| A | P P P P P P P P P P P P P P | I I I I I I I I I I I I I I I I I I I I I I I I I I I I I I I I | R R | A |
|---|---|---|---|---|
| 0 | 1  　　　　14 | 15  　　　　　　　　　　　　　　46 | 47 48 | 49 |

| Y | P P P P P P P P P P P P P P | T T T T T T T T T T T T T T T T T T T T T T T T T | D | L L L L L L L L L |
|---|---|---|---|---|
| 0 | 1  　　　　14 | 15  　　　　　　　　　　　　39 | 40 | 41  　　　　49 |

FIG. 13

| $b_7$ | $b_6$ | $b_5$ | $b_4$ | $b_3$ | $b_2$ | $b_1$ | $b_0$ |
|---|---|---|---|---|---|---|---|
| 0 | 0 | 0 | 1 | 0 | 0 | 0 | 0 |
| 1 | 0 | 0 | 1 | 1 | 0 | 0 | 0 |
| $T_1$ | $T_0$ | pr | $L_4$ | $L_3$ | $L_2$ | $L_1$ | $L_0$ |
| $cid_7$ | $cid_6$ | $cid_5$ | $cid_4$ | $cid_3$ | $cid_2$ | $cid_1$ | $cid_0$ |

SDO_payload ( )

← Variable length

FIG.14

| cmdID value | Meaning |
| --- | --- |
| 0x05 | Watermark based interactive services trigger (TDO model) |
| 0x06 | Watermark based interactive services trigger (Direct execution model) |
| 0x07 | Watermark based location of profile, demographics, interest (PDI) table |
| 0x08 | Watermark based location of audience data server |
| 0x09 | Watermark based base URL for Internet delivery of signaling and announcements |

FIG.15

```
{
  "$schema": "http://json-schema.org/draft-04/schema#",
  "id": "http://atsc.org/version/3.0/wm/recoveryfileformat#",
  "title": "Recovery file format schema",
  "description": "Return messages from server use this schema.",
  "type": "object",
  "properties": {
  "TimeAnchor": {"type": "string", "format": "date-time"},
  "IntervalCodeAnchor": {"type": "integer", "minimum": 0, "maximum": 33554431},
  "ServiceId": {"type": "string"},
  "QuerySpread": {"type": "number"},
  "ChannelId": { "type": "object",
         "properties": {
            "BsID": { "type": "integer","minimum": 0, "maximum": 65535 },
            "MajorChannelNum":{"type": "integer","minimum": 0, "maximum": 1000 },
            "MinorChannelNum":{"type": "integer","minimum": 0, "maximum": 1000 }
         },
         "required": ["BsID","MajorChannelNum","MinorChannelNum"]
      },
  "Event": {
  "type": "object",
  "properties": {
  "EventID": { "type": "integer"},
  "EventTime": {"type": "string", "format": "date-time"},
  "EventKind": { "type": "object",
  "oneOf": [{"$ref": "#/EType/Trigger"},{"$ref": "#/EType/ContentID"},{"$ref": "#/EType/Query"}],
  "EType": {
    "Trigger": {
       "type": "object",
       "properties": {
          "Trigger": {"type": "string", "format": "uri"},
          "Version": {"type": "integer"},
          "UriType": {"type": "string",
             "oneOf": [ {"enum": ["AIT", "MPD","ESG"]},
                   {"pattern": "^EXT"}
             ]},
       "required": ["Trigger","UriType"]
       }
    },
    "ContentID": {
    "type": "object",
      "properties": {
         "oneOf": [ {"Type": {"type": "string", "enum": ["EIDR"]},
             "CID": {"type": "string", "pattern": "^10\\.5240\\/([0-9a-fA-F]{4}-){5}[0-9A-Z]$", "minLength": 34, "maxLength": 34}},
             {"Type": {"type": "string", "enum": ["AD-ID"]},
             "CID": {"type": "string", "pattern": "^[1-9a-zA-Z]{1}[0-9a-zA-Z]{10}(H|D)?$", "minLength": 11, "maxLength": 12}}
             ]
        }
    },
    "ContentIDSimple": {
    "type": "object",
       "properties": {
          "Type": {"type": "string", "enum": ["EIDR", "AD-ID"]},
          "CID": {"type": "string", "minLength": 12, "maxLength": 34}
       }
    },
    "Query": {
    "type": "object",
       "properties": {
          "Spread": {"type": "number"}
       },
       "required": ["Spread"]
    }
        }
      }
        },
  "required": ["EventID","EventTime"],
  "additionalProperties": false
  },
  "required": ["TimeAnchor","IntervalCodeAnchor","Event"],
  "additionalProperties": false
  }
}
```

FIG. 16A

```
JSON  $schema      http://json-schema.org/draft-04/schema#
      id           http://atsc.org/version/3.0/wm/recoveryfileformat#
      title        Recovery file format schema
      description  Return messages from server use this schema.
      type         Object
      properties   TimeAnchor   type        string
                                format      date-time
                   IntervalC...  type        integer
                                minimum     0
                                maximum     33554431
                   ServiceId    type        string
                   QuerySpread  type        number
                   ChannelId    type        object
                                properties  BsID          type       integer
                                                          minimum    0
                                                          maximum    65535
                                            MajorChan...  type       integer
                                                          minimum    0
                                                          maximum    1000
                                            MinorChan...  type       integer
                                                          minimum    0
                                                          maximum    1000
                                required    1  BsID
                                            2  MajorChannelNum
                                            3  MinorChannelNum
                   Event        type        object
                                properties  EventID     type    integer
                                            EventTime   type    string
                                                        format  date-time
                                            EventKind   type    object
                                                        oneOf   1  #/EType/Trigger
                                                                2  #/EType/ContentID
                                                                3  #/EType/Query
                                            EType       Trigger    type        object
                                                                   properties  trigger   type     object
                                                                                         format   trigger
                                                                               Version   type     string
                                                                                                  uri
                                                                               UriType   type     integer
                                                                                         oneOf    string
                                                                                                  1 enum          AIT
                                                                                                                  MPD
                                                                                                                  ESG
                                                                                                                  EXT
                                                                                                  2
                                                                   required    1  Trigger
                                                                               2  UriType
                                                        ContentID  type        object
                                                                   properties  oneOf  1  Type  type   string    CID
                                                                                                     enum     EIDR
                                                                                                     type     string
                                                                                                     enum     AD-ID
                                                                                              2  Type type
                                                        ContentID...  type     object
                                                                      properties  Type  type     string
                                                                                        enum     1  FIDR     CID
                                                                                                 2  AD-ID
                                                                                        CID      type        string
                                                                                                 minLength   12
                                                                                                 maxLength   34
                                                        Query      type         object
                                                                   properties   Spread  type      number
                                                                   required     Spread
                                                                                                              type       string
                                                                                                              pattern    ^\D\\5240\V\[(0-9a-fA-F]{4}-]{5}[0-9A-Z]$
                                                                                                              minLength  34
                                                                                                              maxLength  34
                                                                                                              type       string
                                                                                                              pattern    ^[1-9a-zA-Z]{1}[0-9a-zA-Z]{10}[H]D[1-5
                                                                                                              minLength  11
                                                                                                              maxLength  12
      required   1  TimeAnchor
                 2  IntervalCodeAnchor
                 3  Event
      additionalPr...  false
required         1  EventID
                 2  EventTime
additionalPr...  false
```

FIG.16B

| JSON | $schema | http://json-schema.org/draft-04/schema# | | | | | |
|---|---|---|---|---|---|---|---|
| | id | http://atsc.org/version/3.0/wm/recoveryfileformat# | | | | | |
| | title | Recovery file format schema | | | | | |
| | description | Return messages from server use this schema. | | | | | |
| | type | Object | | | | | |
| | properties | TimeAnchor | type | string | | | |
| | | | format | date-time | | | |
| | | IntervalC... | type | integer | | | |
| | | | minimum | 0 | | | |
| | | | maximum | 33554431 | | | |
| | | ServiceId | type | string | | | |
| | | QuerySpread | type | number | | | |
| | | ChannelId | type | object | | | |
| | | | properties | BsID | type | integer | |
| | | | | | minimum | 0 | |
| | | | | | maximum | 65535 | |
| | | | | MajorChan... | type | integer | |
| | | | | | minimum | 0 | |
| | | | | | maximum | 1000 | |
| | | | | MinorChan... | type | integer | |
| | | | | | minimum | 0 | |
| | | | | | maximum | 1000 | |
| | | | required | 1 BsID | | | |
| | | | | 2 MajorChannelNum | | | |
| | | | | 3 MinorChannelNum | | | |
| | | Event | type | object | | | |
| | | | properties | EventID | type | integer | |
| | | | | EventTime | type | string | |
| | | | | | format | date-time | |
| | | | | EventKind | type | object | |
| | | | | | oneOf | 1 #/EType/Trigger | |
| | | | | | | 2 #/EType/ContentID | |
| | | | | | | 3 #/EType/Query | |
| | | | | | EType | Trigger | type | object |
| | | | | | | | properties | trigger |
| | | | | | | | | Version |
| | | | | | | | | UriType |
| | | | | | | | | required |
| | | | | | | | ContentID | type | object |
| | | | | | | | | properties | oneOf |
| | | | | | | | ContentID... | type | object |
| | | | | | | | | properties | Type |
| | | | | | | | Query | type | object |
| | | | | | | | | properties | Spread |
| | | | | | | | | required | Spread |
| | | | | required | 1 EventID | | | |
| | | | | | 2 EventTime | | | |
| | | | additionalPr... | false | | | |
| | | required | 1 TimeAnchor | | | | |
| | | | 2 IntervalCodeAnchor | | | | |
| | | | 3 Event | | | | |
| | additionalPr... | false | | | | | |

FIG. 16C

```
EType       Trigger        type        object
                           properties
                                       trigger       type       string
                                                     format     uri
                                       Version      type       integer
                                       UriType      type       string
                                                    oneOf                 1  enum                  AIT
                                                                                                    MPD
                                                                                                    ESG
                                                                          2
                           required    1 Trigger
                                       2 UriType
            ContentID     type         object
                          properties
                                       oneOf        1 Type     type       string
                                                                enum       EIDR
                                                                          1 enum                   EIDR
                                                               type       string                   AD-ID
                                                               enum       AD-ID
                                                    2 Type     type       enum
            ContentID...  type         object
                          properties
                                       Type         type       string
                                                    enum       1 enum                              EIDR
                                                               2                                   AD-ID
                                                    CID        type       string                   CID     type      string
                                                               minLength  12                               pattern   ^10\.5240\/([0-9a-fA-F]{4}.){5}[0-9A-Z]$
                                                               maxLength  34                               minLength 34
                                                                                                           maxLength 34
            Query         type         object
                          properties
                                       Spread       type       number                              CID     type      string
                                       Spread                                                              pattern   ^[1-9a-zA-Z][1][0-9a-zA-Z]{10}[H|D]?$
                                       required                                                            minLength 11
                                                                                                           maxLength 12 required      1 EventID
                          2 EventTime
            additionalPr...  false required    1 TimeAnchor
            2 IntervalCodeAnchor
            3 Event
additionalPr...  false
```

FIG.17

```
{
  "$schema": "http://json-schema.org/draft-04/schema#",
  "id": "http://atsc.org/version/3.0/wm/recoveryfileformat#",
  "title": "Recovery file format schema",
  "description": "Return messages from server use this schema.",
  "RecoveryFF": {
  "type": "object",
  "properties": {
  "TimeAnchor": {"type": "string", "format": "date-time"},
  "IntervalCodeAnchor": {"type": "integer", "minimum": 0, "maximum": 33554431},
  "ServiceId": {"type": "string"},
  "QuerySpread": {"type": "number"},
  "ChannelId": { "type": "object",
          "properties": {
             "BsID":  { "type": "integer","minimum": 0, "maximum": 65535 },
             "MajorChannelNum":{"type": "integer","minimum": 0, "maximum": 1000 },
             "MinorChannelNum":{"type": "integer","minimum": 0, "maximum": 1000 }
          },
          "required": ["BsID","MajorChannelNum","MinorChannelNum"]
       },
  "Event": {
  "type": "object",
  "properties": {
  "EventID":  { "type": "integer"},
  "EventTime": {"type": "string", "format": "date-time"},
  "EventKind": { "type": "object",
  "oneOf": [{"$ref": "#/EType/Trigger"},{"$ref": "#/EType/ContentID"},{"$ref": "#/EType/Query"}],
  "EType": {
     "Trigger": {
        "type": "object",
        "properties": {
           "Trigger": {"type": "string", "format": "uri"},
           "TriggerVersion": {"type": "integer"},
           "UriType": {"type": "string",
                  "oneOf": [ {"enum": ["AIT", "MPD","ESG"]},
                         {"pattern": "^EXT"}
                  ]},
           "required": ["Trigger","UriType"]
        }
     },
     "ContentID": {
     "type": "object",
        "properties": {
           "oneOf": [ {"Type": {"type": "string", "enum": ["EIDR"]},
              "CID": {"type": "string", "pattern": "^10\\.5240\\/([0-9a-fA-F]{4}-){5}[0-9A-Z]$", "minLength": 34, "maxLength": 34}},
              {"Type": {"type": "string", "enum": ["AD-ID"]},
              "CID": {"type": "string", "pattern": "^[1-9a-zA-Z]{1}[0-9a-zA-Z]{10}(H|D)?$", "minLength": 11, "maxLength": 12}}
           ]
        }
     }, "Query": {
     "type": "object",
        "properties": {
           "Spread": {"type": "number"}
        },
        "required": ["Spread"]
     }
           }
        }
     },
  "required": ["EventID","EventTime"],
  "additionalProperties": false
  },
  "required": ["TimeAnchor","IntervalCodeAnchor","Event"],
  "additionalProperties": true
  }
  }
    }
```

FIG.18

```
{
    "$schema": "http://json-schema.org/draft-04/schema#",
    "id": "http://atsc.org/version/3.0/wm/recoveryfileformat#",
    "title": "Recovery file format schema",
    "description": "Return messages from server use this schema.",
    "RecoveryFF": {
    "type": "object",
    "properties": {
    "TimeAnchor": {"type": "string", "format": "date-time"},
    "IntervalCodeAnchor": {"type": "integer", "minimum": 0, "maximum": 33554431},
    "ServiceId": {"type": "string"},
    "QuerySpread": {"type": "number"},
    "ChannelId": { "type": "object",
            "properties": {
                "BsID": { "type": "integer","minimum": 0, "maximum": 65535 },
                "MajorChannelNum":{"type": "integer","minimum": 0, "maximum": 1000 },
                "MinorChannelNum":{"type": "integer","minimum": 0, "maximum": 1000 }
            },
            "required": ["BsID","MajorChannelNum","MinorChannelNum"]
        },
    "Event": {
    "type": "object",
    "properties": {
    "EventID": { "type": "integer"},
    "EventTime": {"type": "string", "format": "date-time"},
    "EventKind": { "type": "object",
    "oneOf": [{"$ref": "#/EType/Trigger"},{"$ref": "#/EType/ContentID"},{"$ref": "#/EType/Query"}],
    "EType": {
      "Trigger": {
        "type": "object",
        "properties": {
          "Trigger": {"type": "string", "format": "uri"},
          "TriggerVersion": {"type": "integer"},
          "UriType": {"type": "string",
                "oneOf": [ {"enum": ["AIT", "MPD","ESG"]},
                        {"pattern": "^EXT"}
                ]},
          "required": ["Trigger","UriType"]
        }
      },
      "ContentID": {
      "type": "object",
        "properties": {
          "oneOf": [ {"Type": {"type": "string", "enum": ["EIDR"]},
                "CID": {"type": "string", "pattern": "^10\\.5240\\V([0-9a-fA-F]{4}-){5}[0-9A-Z]$", "minLength": 34, "maxLength": 34}},
                {"Type": {"type": "string", "enum": ["AD-ID"]},
                "CID": {"type": "string", "pattern": "^[1-9a-zA-Z]{1}[0-9a-zA-Z]{10}(H|D)?$", "minLength": 11, "maxLength": 12}}
                ]
        }
      }, "Query": {
      "type": "object",
        "properties": {
          "Spread": {"type": "number"}
        },
        "required": ["Spread"]
      }
          }
        }
      },
    "required": ["EventID","EventTime"],
    "additionalProperties": false
    },
    "required": ["TimeAnchor","IntervalCodeAnchor","Event"],
    "additionalProperties": true
    },
    "RecoveryFFV2": {
    "type": "object",
    "properties": {
      "V2": {"allOf": [
        {"$ref": "#/RecoveryFF"},
        {
          "properties": {
            "newkeyA": "valueA",
            "newkeyB": "valueB"
          },
          "required": ["newkeyA"],
          "additionalProperties": true
        }
      ]}
    }
  }
}
```

FIG.19

```
{
  "$schema": "http://json-schema.org/draft-04/schema#",
  "id": "http://atsc.org/version/3.0/wm/recoveryfileformat#",
  "title": "Recovery file format schema",
  "description": "Return messages from server use this schema.",
  "@context":

{
            "RecoveryFF": "http://www.atsc.org/contexts/3.0/RecoveryFF"

},
  "RecoveryFF": {

"type": "object",
  "properties": {
  "TimeAnchor": {"type": "string", "format": "date-time"},
  "IntervalCodeAnchor": {"type": "integer", "minimum": 0, "maximum": 33554431},
  "ServiceId": {"type": "string"},
  "QuerySpread": {"type": "number"},
  "ChannelId": { "type": "object",
          "properties": {
             "BsID":  { "type": "integer","minimum": 0, "maximum": 65535 },
             "MajorChannelNum":{"type": "integer","minimum": 0, "maximum": 1000 },
             "MinorChannelNum":{"type": "integer","minimum": 0, "maximum": 1000 }
          },
          "required": ["BsID","MajorChannelNum","MinorChannelNum"]
       },
  "Event": {
  "type": "object",
  "properties": {
  "EventID": { "type": "integer"},
  "EventTime": {"type": "string", "format": "date-time"},
  "EventKind": { "type": "object",
  "oneOf": [{"$ref": "#/EType/Trigger"},{"$ref": "#/EType/ContentID"},{"$ref": "#/EType/Query"}],
  "EType": {
     "Trigger": {
        "type": "object",
        "properties": {
           "Trigger": {"type": "string", "format": "uri"},
           "TriggerVersion": {"type": "integer"},
           "UriType": {"type": "string",
                "oneOf": [ {"enum": ["AIT", "MPD","ESG"]},
                        {"pattern": "^EXT"}
                ]},
           "required": ["Trigger","UriType"]
        }
     },
     "ContentID": {
     "type": "object",
        "properties": {
           "oneOf": [ {"Type": {"type": "string", "enum": ["EIDR"]},
                 "CID": {"type": "string", "pattern": "^10\\.5240\\/([0-9a-fA-F]{4}-){5}[0-9A-Z]$", "minLength": 34, "maxLength": 34}},
                {"Type": {"type": "string", "enum": ["AD-ID"]},
                 "CID": {"type": "string", "pattern": "^[1-9a-zA-Z]{1}[0-9a-zA-Z]{10}(H|D)?$", "minLength": 11, "maxLength": 12}}
           ]
        }
     }, "Query": {
     "type": "object",
        "properties": {
           "Spread": {"type": "number"}
        },
        "required": ["Spread"]
     }
        }
     }
     },
  "required": ["EventID","EventTime"],
  "additionalProperties": false
  },
  "required": ["TimeAnchor","IntervalCodeAnchor","Event"],
  "additionalProperties": true
  }
 }
}
```

FIG.20

```
{
    "$schema": "http://json-schema.org/draft-04/schema#",
    "id": "http://atsc.org/version/3.0/wm/recoveryfileformat#",
    "title": "Recovery file format schema",
    "description": "Return messages from server use this schema.",
    "@context":
    {
            "RecoveryFF": "http://www.atsc.org/contexts/3.0/RecoveryFF"
            "RecoveryFF2": "http://www.atsc.org/contexts/3.1/RecoveryFF"
    },
    "RecoveryFF": {
    "type": "object",
    "properties": {
    "TimeAnchor": {"type": "string", "format": "date-time"},
    "IntervalCodeAnchor": {"type": "integer", "minimum": 0, "maximum": 33554431},
    "ServiceId": {"type": "string"},
    "QuerySpread": {"type": "number"},
    "ChannelId": { "type": "object",
            "properties": {
                "BsID":  { "type": "integer","minimum": 0, "maximum": 65535 },
                "MajorChannelNum":{"type": "integer","minimum": 0, "maximum": 1000 },
                "MinorChannelNum":{"type": "integer","minimum": 0, "maximum": 1000 }
            },
            "required": ["BsID","MajorChannelNum","MinorChannelNum"]
        },
    "Event": {
    "type": "object",
    "properties": {
    "EventID": { "type": "integer"},
    "EventTime": {"type": "string", "format": "date-time"},
    "EventKind": { "type": "object",
    "oneOf": [{"$ref": "#/EType/Trigger"},{"$ref": "#/EType/ContentID"},{"$ref": "#/EType/Query"}],
    "EType": {
        "Trigger": {
        "type": "object",
        "properties": {
            "Trigger": {"type": "string", "format": "uri"},
            "TriggerVersion": {"type": "integer"},
            "UriType": {"type": "string",
                "oneOf": [ {"enum": ["AIT", "MPD","ESG"]},
                        {"pattern": "^EXT"}
                ]},
            "required": ["Trigger","UriType"]
        }
        },
        "ContentID": {
        "type": "object",
        "properties": {
            "oneOf": [ {"Type": {"type": "string", "enum": ["EIDR"]},
                "CID": {"type": "string", "pattern": "^10\\.5240\\/([0-9a-fA-F]{4}-){5}[0-9A-Z]$", "minLength": 34, "maxLength": 34}},
                {"Type": {"type": "string", "enum": ["AD-ID"]},
                "CID": {"type": "string", "pattern": "^[1-9a-zA-Z]{1}[0-9a-zA-Z]{10}(H|D)?$", "minLength": 11, "maxLength": 12}}
            ]
        }
        }, "Query": {
        "type": "object",
            "properties": {
                "Spread": {"type": "number"}
            },
            "required": ["Spread"]
        }
            }
        }
        },
    "required": ["EventID","EventTime"],
    "additionalProperties": false
    },
    "required": ["TimeAnchor","IntervalCodeAnchor","Event","newKeyB"],
    "additionalProperties": true
    },
"RecoveryFF2": {
    "type": "object",
    "properties": {

"newkeyA": "valueA",
            "newkeyB": "valueB"
            },
    "required": ["newkeyA"], "additionalProperties": true
        }
    }
}
```

FIG.21

```
{
  "$schema": "http://json-schema.org/draft-04/schema#",
  "id": "http://atsc.org/version/3.0/wm/recoveryfileformat#",
  "title": "Recovery file format schema",
  "description": "Return messages from server use this schema.",
  "@context":
  {
          "RecoveryFF": "http://www.atsc.org/contexts/3.1/RecoveryFFV1"
  },
  "RecoveryFF": {
  "type": "object",
  "properties": {
  "TimeAnchor": {"type": "string", "format": "date-time"},
  "IntervalCodeAnchor": {"type": "integer", "minimum": 0, "maximum": 33554431},
  "ServiceId": {"type": "string"},
  "QuerySpread": {"type": "number"},
  "ChannelId": { "type": "object",
          "properties": {
             "BsID":  { "type": "integer","minimum": 0, "maximum": 65535 },
             "MajorChannelNum":{"type": "integer","minimum": 0, "maximum": 1000 },
             "MinorChannelNum":{"type": "integer","minimum": 0, "maximum": 1000 }
          },
          "required": ["BsID","MajorChannelNum","MinorChannelNum"]
     },
  "Event": {
  "type": "object",
  "properties": {
  "EventID":  { "type": "integer"},
  "EventTime": {"type": "string", "format": "date-time"},
  "EventKind": { "type": "object",
  "oneOf": [{"$ref": "#/EType/Trigger"},{"$ref": "#/EType/ContentID"},{"$ref": "#/EType/Query"}],
  "EType": {
     "Trigger": {
        "type": "object",
        "properties": {
           "Trigger": {"type": "string", "format": "uri"},
           "TriggerVersion": {"type": "integer"},
           "UriType": {"type": "string",
                 "oneOf": [ {"enum": ["AIT", "MPD","ESG"]},
                      {"pattern": "^EXT"}
                 ]},
           "required": ["Trigger","UriType"]
        }
     },
     "ContentID": {
     "type": "object",
        "properties": {
           "oneOf": [ {"Type": {"type": "string", "enum": ["EIDR"]},
                 "CID": {"type": "string", "pattern": "^10\\.5240\\/([0-9a-fA-F]{4}-){5}[0-9A-Z]$", "minLength": 34, "maxLength": 34}},
                 {"Type": {"type": "string", "enum": ["AD-ID"]},
                 "CID": {"type": "string", "pattern": "^[1-9a-zA-Z]{1}[0-9a-zA-Z]{10}(H|D)?$", "minLength": 11, "maxLength": 12}}
              ]
        }
     },
  "Query": {
        "type": "object",
        "properties": {
           "Spread": {"type": "number"}
        },
        "required": ["Spread"]
     }
           }
        }
     },
  "required": ["EventID","EventTime"],
  "additionalProperties": false
  },
  "newkeyA": "valueA",
  "newkeyB": "valueB",
  "required": ["TimeAnchor","IntervalCodeAnchor","Event","newKeyB"],
  "additionalProperties": true
  }
 }
}
```

EXTENSIBLE WATERMARK ASSOCIATED INFORMATION RETRIEVAL

TECHNICAL FIELD

The present invention relates generally to a system with audio-visual content watermarking.

BACKGROUND ART

In many digital broadcasting systems, a broadcasting station transmits audio-visual content and one or more enhanced service data. The enhanced service data may be provided with the audio-visual (AV) content to provide information and services or may be provided separately from the AV content to provide information and services.

In many broadcasting environments, the AV content and the one or more enhanced service data is not received directly by an AV presentation device from the broadcasting station. Rather the AV presentation device, such as a television, is typically connected to a broadcast receiving device that receives the AV content and the one or more enhanced service data in a compressed form and provides uncompressed AV content to the AV presentation device.

In some broadcasting environments, the broadcast receiving device receives AV content from a server (sometimes referred to as a Multichannel Video Programming Distributor (MVPD)). The MVPD receives an AV broadcast signal from the broadcasting station, extracts content from the received AV broadcast signal, converts the extracted content into AV signals having a suitable format for transmission, and provides the converted AV signals to the broadcast receiving device. During the conversion process, the MVPD often removes the enhanced service data provided from the broadcasting station or may incorporate a different enhanced service data that is provided to the broadcast receiving device. In this manner, the broadcasting station may provide the AV content with enhanced service data, but the enhanced service data, if any, that is ultimately provided to the AV presentation device and/or the broadcast receiving device may not be the same as that provided by the broadcasting station.

Since the broadcast receiving device extracts AV content from the signal received from the MVPD and provides only uncompressed AV data to the AV presentation device, only enhanced service data provided to the broadcast receiving device is available. Furthermore, the same enhanced service data provided by the broadcasting station may not be provided to the broadcast receiving device and/or AV presentation device.

The foregoing and other objectives, features, and advantages of the invention will be more readily understood upon consideration of the following detailed description of the invention, taken in conjunction with the accompanying drawings.

SUMMARY OF INVENTION

One embodiment of the present invention discloses a method of processing a data stream comprising: (a) receiving said data stream including a watermark message encoded within said data stream; (b) extracting a corresponding recovery file location from said watermark message; (c) receiving a recovery file based upon said recovery file location that includes a corresponding content identifier; (d) selectively extracting said content identifier from said recovery file when said content identifier is an object that includes properties of a pattern expression to express a constraint as a string, where said string is entertainment identifier register information.

Another embodiment of the present invention discloses a receiver for processing a data stream comprising: (a) said receiver receiving said data stream including a watermark message encoded within said data stream; (b) said receiver extracting a corresponding recovery file location from said watermark message; (c) said receiver receiving a recovery file based upon said recovery file location that includes a corresponding content identifier; (d) said receiver selectively extracting said content identifier from said recovery file when said content identifier is an object that includes properties of a pattern expression to express a constraint as a string, where said string is entertainment identifier register information.

BRIEF DESCRIPTION OF DRAWINGS

FIG. 13 illustrates a standards development organization (SDO) private data.

FIG. 14 illustrates metadata encapsulated within SDO private data as a SDO payload using one or more cmdIDs.

FIG. 15 illustrates an exemplary JavaScript Object Notation schema.

FIG. 16A illustrates logical structure of a JavaScript Object Notation schema.

FIG. 16B illustrates the left half part of FIG. 16A.

FIG. 16C illustrates the lower half part of FIG. 16A.

FIG. 17 illustrates an exemplary watermark associated information retrieval JavaScript Object Notation schema.

FIG. 18 illustrates an exemplary recovery file format JavaScript Object Notation schema.

FIG. 19 illustrates an exemplary watermark associated information retrieval JavaScript Object Notation schema.

FIG. 20 illustrates an exemplary recovery file format JavaScript Object Notation schema.

FIG. 21 illustrates an exemplary recovery file format JavaScript Object Notation schema.

DESCRIPTION OF EMBODIMENTS

Figure 1:
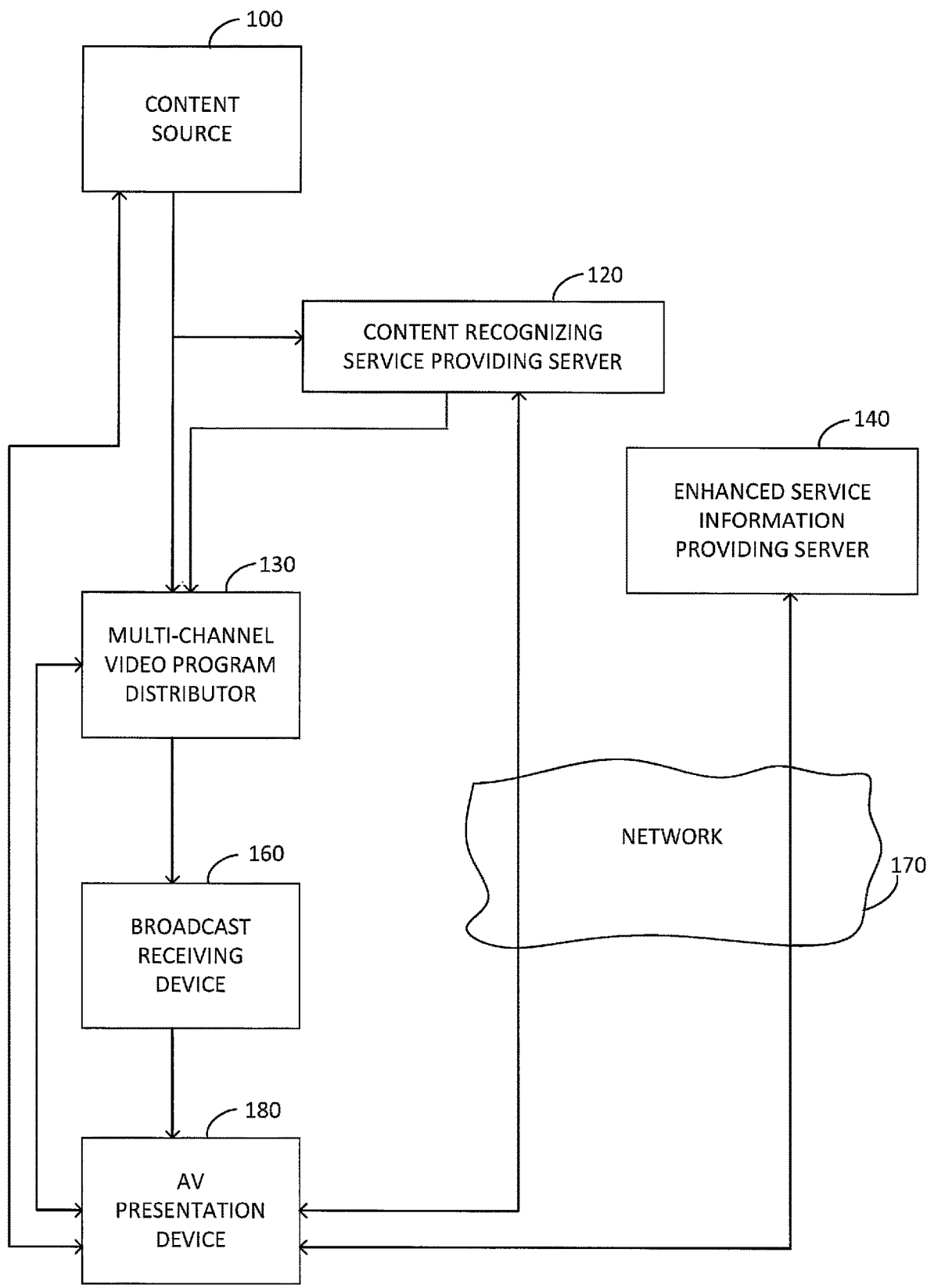
FIG. 1 illustrates a system with enhanced service information.

Referring to FIG. 1, the system may include a content source 100, a content recognizing service providing server 120, a MVPD 130, an enhanced service information providing server 140, a broadcast receiving device 160, a network 170, and an AV presentation device 180.

The content source 100 may correspond to a broadcasting station that broadcasts a broadcast signal including one or more streams of AV content (e.g., audio and/or video). The broadcast signal may further include enhanced services data and/or signaling information. The enhanced services data preferably relates to one or more of the AV broadcast streams. The enhanced data services may have any suitable format, such as for example, service information, metadata, additional data, compiled execution files, web applications, hypertext markup language (HTML) documents, extensible markup language (XML) documents, cascading style sheet (CSS) documents, audio files, video files, Advanced Television Systems Committee (ATSC) 2.0, future versions contents, and addresses such as a uniform resource locator (URL).

The content recognizing service providing server 120 provides a content recognizing service that allows the AV presentation device 180 to recognize content on the basis of AV content from the content source 100. The content recognizing service providing server 120 may optionally modify the AV broadcast content, such as by including a watermark.

The content recognizing service providing server 120 may include a watermark inserter. The watermark inserter may insert watermarks which are designed to carry enhanced services data and/or signaling information, while being imperceptible or at least minimally intrusive to viewers. In other cases a readily observable watermark may be inserted (e.g., readily observable may be readily visible in the image and/or readily observable may be readily audible in the audio). For example, the readily observable watermark may be a logo, such as a logo of a content provider at the upper-left or upper-right of each frame.

The content recognizing service providing server 120 may include a watermark inserter that modifies the AV content to include a non-readily observable watermark (e.g., non-readily observable may be readily non-visible in the image and/or non-readily observable may be non-readily audible in the audio). For example, the non-readily observable watermark may include security information, tracking information, data, or otherwise. Another example includes the channel, content, timing, triggers, and/or URL information.

The MVPD 130 receives broadcast signals from one or more broadcasting stations and typically provides multiplexed broadcast signals to the broadcast receiving device 160. The MVPD 130 may perform demodulation and channel decoding on the received broadcast signals to extract the AV content and enhanced service data. The MVPD 130 may also perform channel encoding on the extracted AV content and enhanced service data to generate a multiplexed signal for further distribution. The MVPD 130 may exclude the extracted enhanced service data and/or may include a different enhanced service data.

The broadcast receiving device 160 may tune to a channel selected by a user and receive an AV signal of the tuned channel. The broadcast receiving device 160 typically performs demodulation and channel decoding on the received signal to extract desired AV content. The broadcast receiving device 160 decodes the extracted AV content using any suitable technique, such as for example, a H.264, a Motion Picture Experts Group Advanced Video Coding (MPEG-AVC), an H.265, a High Efficiency Video Coding (HEVC), a Dolby Digital (AC3), and/or an Advanced Audio Coding (AAC) system. The broadcast receiving device 160 typically provides uncompressed AV content to the AV presentation device 180.

The enhanced service information providing server 140 provides enhanced service information to AV content in response to a request from the AV presentation device 180.

The AV presentation device 180 may include a display, such as for example, a television, a notebook computer, a mobile phone, and a smart phone. The AV presentation device 180 may receive uncompressed (or compressed) AV or video or audio content from the broadcast receiving device 160, a broadcast signal including encoded AV or video or audio content from the content source 100, and/or encoded or decoded AV or video or audio content from the MVPD 130. In some cases the uncompressed video and audio may be received via an High-Definition Multimedia Interface (HDMI) cable. The AV presentation device 180 may receive from the content recognizing service providing server 120 through the network 170, an address of an enhanced service relating to the AV content from the enhanced service information providing server 140.

It is to be understood that the content source 100, the content recognizing service providing server 120, the MVPD 130, and the enhanced service information providing server 140 may be combined, or omitted, as desired. It is to be understood that these are logical roles. In some case some of these entities may be separate physical devices. In other cases some of these logical entities may be embodied in same physical device. For example, the broadcast receiving device 160 and AV presentation device 180 may be combined, if desired.

Figure 2:
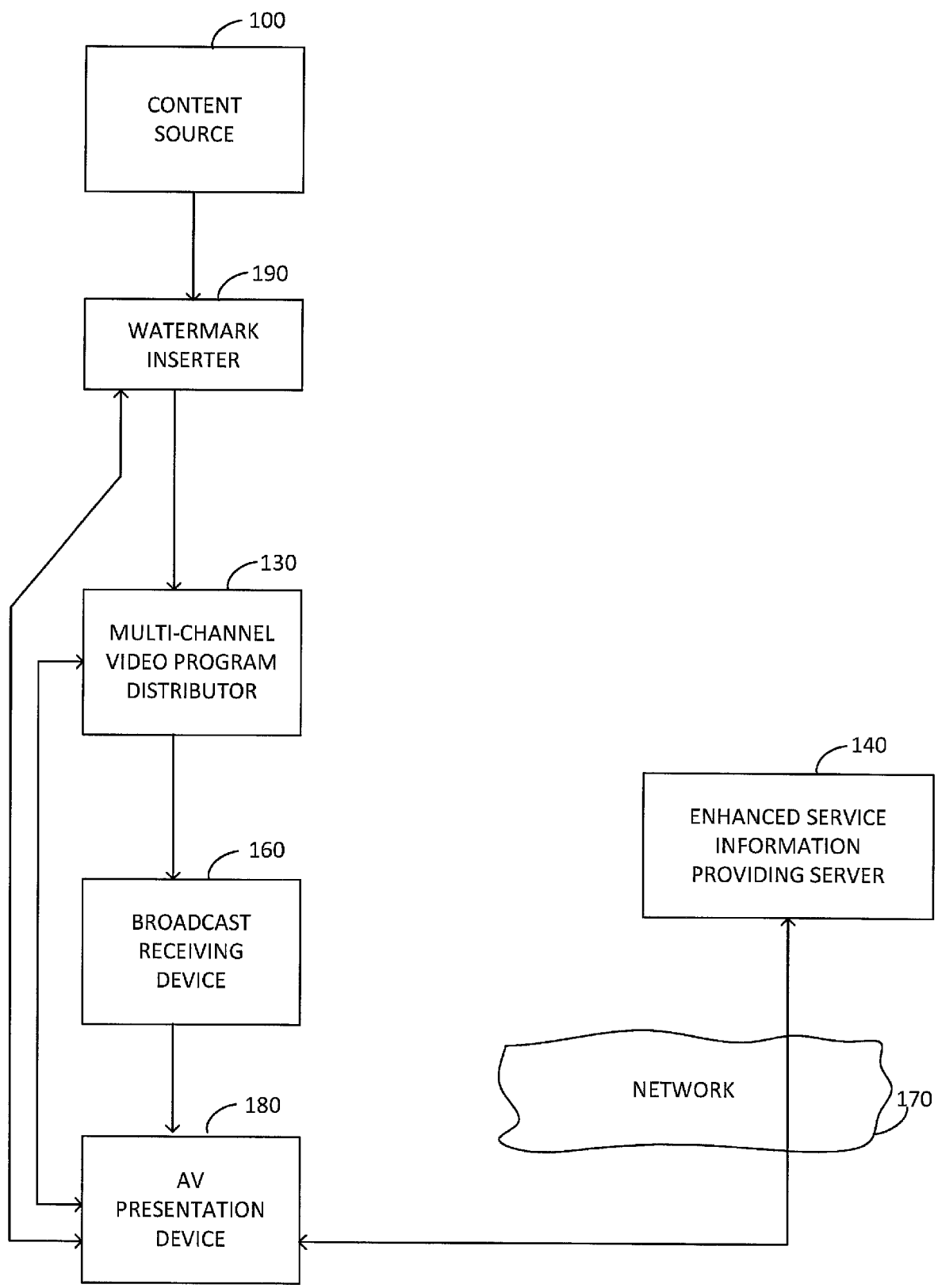
FIG. 2 illustrates another system with enhanced information.

Referring to FIG. 2, a modified system may include a watermark inserter 190. The watermark inserter 190 may modify the AV (e.g., the audio and/or video) content to include additional information in the AV content. The MVPD 130 may receive and distribute a broadcast signal including the modified AV content with the watermark.

The watermark inserter 190 preferably modifies the signal in a manner that includes additional information which is non-readily observable (e.g., visually and/or audibly) in the form of digital information. In non-readily observable watermarking, the inserted information may be readily identifiable in the audio and/or video. In non-readily observable watermarking, although information is included in the AV content (e.g., the audio and/or video), a user is not readily aware of the information.

One use for the watermarking is copyright protection for inhibiting illegal copying of digital media. Another use for the watermarking is source tracking of digital media. A further use for the watermarking is descriptive information for the digital media. Yet another use for the watermarking is providing location information for where additional content may be received associated with the digital media. Yet another use is to identify content and content source that is being viewed and the current time point in the content, and then allowing the device to access the desired additional functionality via an Internet connection. The watermark information is included within the AV content itself, as distinguished from, meta-data that is delivered along with the AV content. By way of example, the watermark information may be included by using a spread spectrum technique, a quantization technique, and/or an amplitude modulation technique.

Figure 3:
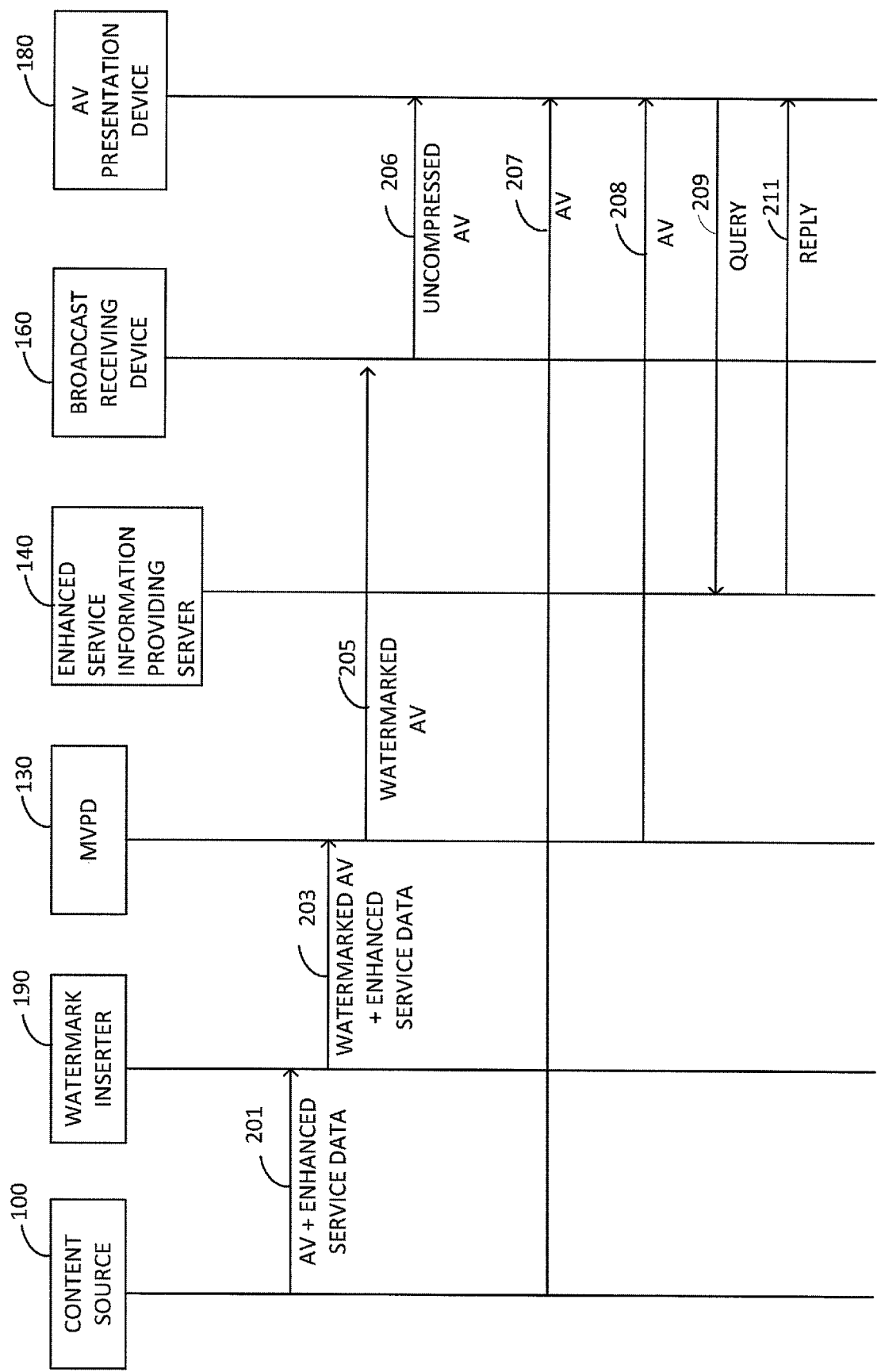
FIG. 3 illustrates a data flow for a system with enhanced information.

Referring to FIG. 3, an exemplary data flow is illustrated. The content source 100 transmits a broadcast signal including at least one AV content and an enhanced service data 201 to the watermark inserter 190.

The watermark inserter 190 receives the broadcast signal that the content source 100 provides and includes a readily observable and/or a non-readily observable watermark in the AV content. The modified AV content with the watermark is provided together with enhanced service data 203 to the MVPD 130.

The content information associated with the watermark may include, for example, identification information of a content provider that provides AV content, AV content identification (ContentID) information, time information of a content section used in content information acquisition, names of channels through which AV content is broadcasted, logos of channels through which AV content is broadcasted, descriptions of channels through which the AV content is broadcasted, a usage information reporting period, the minimum usage time for usage information acquisition, statistics for sporting events, display of useful information, widgets, applications, executables, and/or available enhanced service information relating to AV content.

The acquisition path of available enhanced service data may be represented in any manner, such an Internet Protocol (IP) based path or an ATSC-Mobile/Handheld path.

The MVPD 130 receives broadcast signals including watermarked AV content and enhanced data service and may generate a multiplexed signal to provide it 205 to the broadcast receiving device 160. At this point, the multiplexed signal may exclude the received enhanced service data and/or may include a different enhanced service data.

The broadcast receiving device 160 may tune to a channel that a user selects and receives signals of the tuned channel, demodulates the received signals, performs channel decoding and audio-video decoding on the demodulated signals to generate an uncompressed audio-video content, and then, provide 206 the uncompressed AV content to the AV presentation device 180. The content source 100 may also broadcast 207 the AV content through a channel to the AV presentation device 180. The MVPD 130 may directly transmit 208 a broadcast signal including AV content to the AV presentation device 180 without going through the broadcast receiving device 160. In yet another case some of the AV information may be sent to the AV presentation device 180 over a broadband connection. In some cases this may be managed broadband connection. In another case it may be unmanaged broadband connection.

The AV presentation device 180 may receive uncompressed (or compressed) AV content from the broadcast receiving device 160. Additionally, the AV presentation device 180 may receive a broadcast signal through a channel from the content source 100, and then, may demodulate and decode the received broadcast signal to obtain AV content. Additionally, the AV presentation device 180 may receive a broadcast signal from the MVPD 130, and then, may demodulate and decode the received broadcast signal to obtain AV content. The AV presentation device 180 (or broadcast receiving device 160) extracts watermark information from one or more video frames or a selection of audio samples of the received AV content. The AV presentation device 180 may use the information obtained from the watermark(s) to make a request 209 to the enhanced service information providing server 140 (or any other device) for additional information. The enhanced service information providing server 140 may provide, in response thereto a reply 211.

Figure 4:
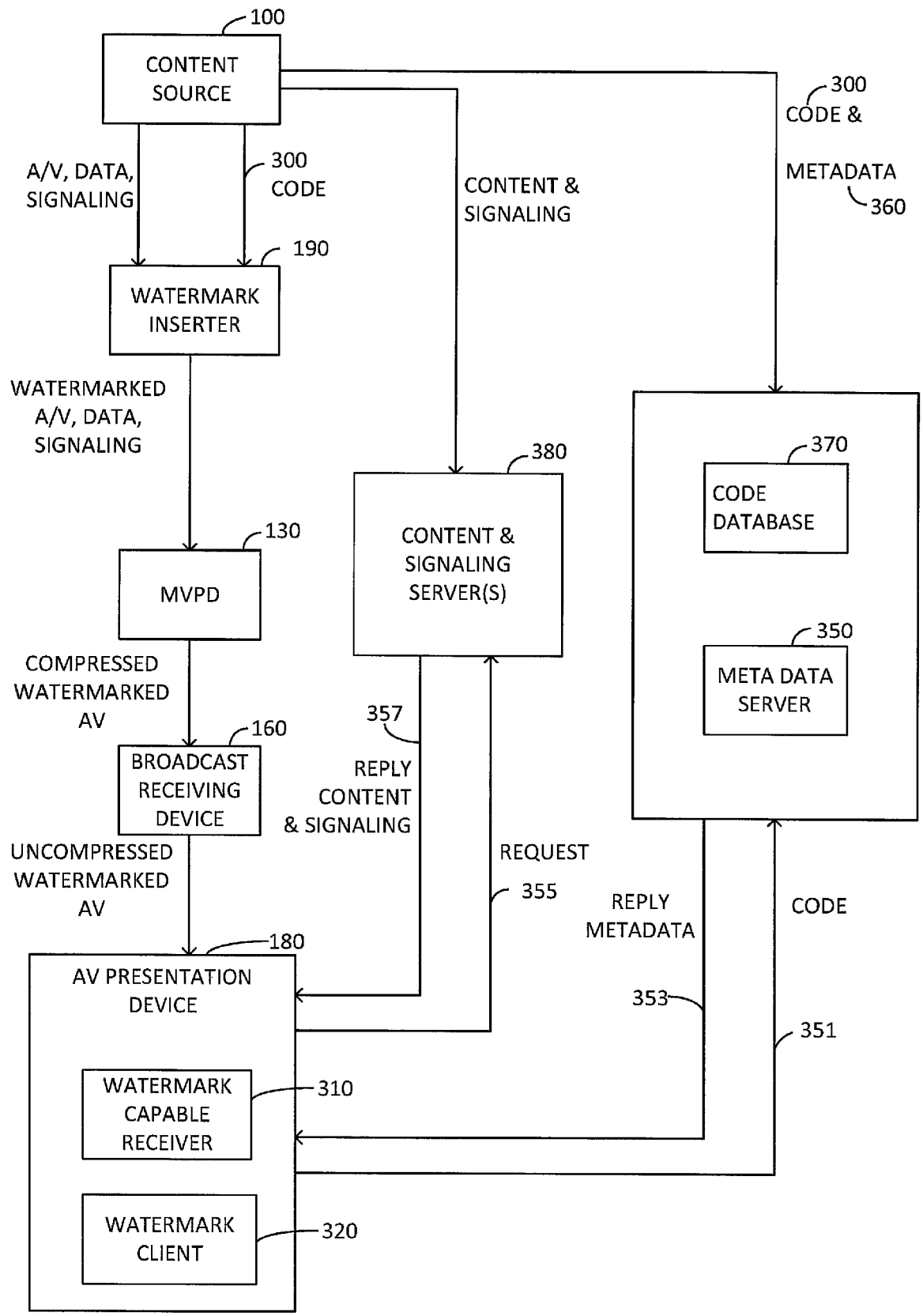
FIG. 4 illustrates another system with enhanced information.

Referring to FIG. 4, a further example includes the content source 100 that provides AV content together with enhanced service data (if desired) to the watermark inserter 190. In addition, the content source 100 may provide a code 300 to the watermark inserter 190 together with the AV content. The code 300 may be any suitable code to identify which, among a plurality of AV streams, should be modified with the watermark. For example code=1 may identify the first AV stream, code=2 may identify the second AV stream, code=3 may identify the third AV stream, code=4 may identify the fourth AV stream, etc. The code may include temporal location information within the AV content. The code may include other metadata, if desired.

The watermarked AV content and associated data, signaling is provided by the watermark inserter 190 to the MVPD, which in turn may provide the watermarked compressed AV content to the broadcast receiving device 160 (e.g., a set top box). The broadcast receiving device 160 may provide watermarked AV content (e.g., typically uncompressed) to the AV presentation device 180. The AV presentation device 180 may include a watermark capable receiver 310 together with a watermark client 320. The watermark capable receiver 310 is suitable to detect the existence of the watermark within the AV content, and to extract the watermark data from within the AV content. The watermark client 320 is suitable to use the data extracted from the watermark to request additional data based thereon, and subsequently use this additional data in a suitable manner.

The AV presentation device 180 may use the code 300 from the extracted watermark to make a request to a metadata server 350. A code database 370 receives the data from the content source 100 that includes the code 300 and metadata 360. The code 300 and metadata 360 is stored in the code database 370 for subsequent use. In this manner, the code 300 that is provided to the watermark inserter 190 which is encoded within the AV content is also stored in the code database 370 together with its metadata 360. In the event that the MVPD 130, or otherwise, removes the associated metadata or otherwise changes the associated metadata, it is recoverable by the AV presentation device 180 from the metadata server 350 which uses the provided code 351 to query the code database 370 and provide an associated response with the metadata 353 to the AV presentation device 180. The reply metadata provided by the metadata server 350 is used by the AV presentation device 180 to form a request 355 that is provided to the content and signaling server 380. The content and signaling server 380, in response to the request, provides selected content and signaling 357 to the AV presentation device 180. In general, the content and signaling server 380 may be different from the metadata server 350.

However, making a first request to the metadata server to obtain a response to the code provided, then subsequently using the metadata to provide a request to the content and signaling server 380 is burdensome, and prone to failure, due to the two different servers and/or requests that are utilized. Additionally it may increase the latency.

By way of example, the metadata may consist of one or more of the following syntax elements:

(1) location of content and signaling server (e.g., where is the server, such as its network address. Examples of network addresses are domain names, IP v4 addresses, etc.);

(2) protocol to be used for communication with the content and signaling server; for example, the Hypertext Transfer Protocol Secure (HTTPS) or the Hypertext Transfer Protocol (HTTP);

(3) time code identifying a temporal location in the AV content (e.g., where the metadata should be associated with in the AV content);

(4) time sensitive event trigger (e.g., an advertisement or an event for a particular location in the AV content);

(5) channel identification (e.g., channel specific information; local channel content);

(6) duration over which the content and signaling server requests are randomly carried out by client (e.g., for load balancing). For brevity, this syntax element may also be referred to as duration for content server requests;

(7) etc.

The watermark(s) embedded in the audio-video content typically have a capacity to carry only a few bits of payload information when the watermarked audio-video broadcast has non-readily observable information. For relatively small payload sizes, the time code (element 3 above) and/or the location of the content and signaling server (element 1 above) tends to take on a significant percentage of the available payload leaving limited additional payload for the remaining data, which tends to be problematic.

To include sufficient metadata within the watermark, so that both the time code and the location information may be provided together with additional information, it may be desirable to partition the metadata across multiple watermark payloads. Each of the watermark payloads is likewise preferably included within different portions of the AV content. The data extracted from the multiple watermark payloads are combined together to form a set of desirable information to be used to make a request. In the description below the term payload may be used to indicate watermark payload. Each of the syntax elements may be included within a single payload, spanned across multiple payloads, and/or fragmented across multiple payloads. Each payload may be assigned a payload type for purposes of identification. Further, an association may be established between multiple payloads belonging to the same or approximately the same timeline location. Also, the association may be uni-directional or bi-directional, as desired.

The desired time code data may be obtained from payload (s) that span across several temporal locations of the AV content. Therefore some systems may establish rules to associate the determined time code with a particular temporal location of the AV content. In an example, the chosen temporal location may correspond to the temporal location at the end of a pre-determined watermark payload.

For example, the payload size may be 50 bits while the desirable metadata may be 70 bits, thus exceeding the payload size of a single watermark. An example of the desirable metadata may be as follows:

| | |
|---|---|
| location of content and server (I) | 32 bits (IP address) |
| application layer protocol (A) | 1 bit (HTTP or HTTPS) |
| time code (T) | 25 bits (for 1 year of uniqueness with a granularity of 1 second) |
| time sensitive trigger (D) | 1 bit (A value of 1 indicates the AV presentation device should query for interactive content. A value of 0 indicates the AV presentation device should not query for interactive content (e.g. as in time base trigger)). |

| | |
|---|---|
| channel identification (L) | 9 bits |
| duration for content server requests (R) | 2 bits |

Another example of the desirable metadata may be as follows:

| | |
|---|---|
| location of content and server (I) | 32 bits (IP address) |
| application layer protocol (A) | 2 bit (00 = HTTP/01 = HTTPS, 10 = reserved, 11 = reserved) |
| time code (T) | 25 bits (for 1 year of uniqueness with a granularity of 1 second) |
| time sensitive trigger (D) | 1 bit |
| channel identification (L) | 9 bits |
| duration for content server requests (R) | 2 bits |

One manner of partitioning the metadata is to include the content and signal server communication information (CSSCI) in one payload and timeline information in another payload. The CSSCI payload may include, for example, where information (e.g., location of content and signaling server), association information (e.g., an identifier to associate the CSSCI payload with one or more other payloads), and how information (e.g., application layer protocol, duration for content server requests). The timeline information may include, for example, association information (e.g., an identifier to associate the timeline with one or more other payloads), when information (e.g., time code information), and which information (e.g., channel identification).

Figures 5, 6, 7:
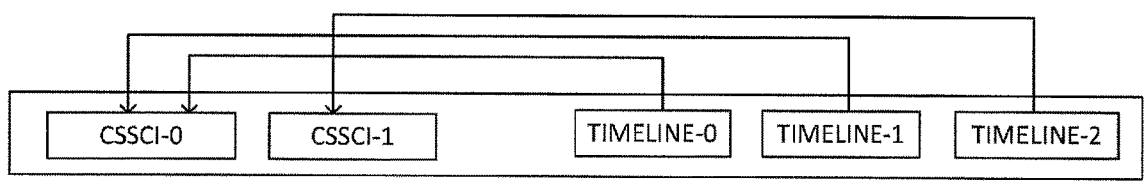
FIG. 5 illustrates a watermark payload.
FIG. 6 illustrates another watermark payload.
FIG. 7 illustrates relationships between watermark payloads.

Referring to FIG. 5, an exemplary CSSCI payload is illustrated.

Referring to FIG. 6, an exemplary time location payload is illustrated. The term time location may be alternatively used in place of the term temporal location.

The payload type may be identified by the first bit, "Y". When Y is set to 0 the payload corresponds to CSSCI payload and the 14 bit payload identifier (P) is used to label the CSSCI. When Y is set to 1 the payload corresponds to the temporal location payload and the 14 bit payload identifier (P) signals the corresponding CSSCI. As a result, different payload types with same payload identifier (P) value are associated with each other. The identifier R indicates a time duration over which to spread the content and signaling server requests. In an example, Y may correspond to a 2-bit field where the value 00 indicates a CSSCI payload, the value 01 indicates a temporal location payload and the values 10, 11 are reserved for future use.

Referring to FIG. 7, an exemplary time line is illustrated. A first CSSCI type payload (e.g., CSSCI-0) has a first set of association information P while a second CSSCI type payload (e.g., CSSCI-1) has a second different set of association information P. Having two different association information P for CSSCI-0 and CSSCI-1 distinguish between and identify the two CSSCI payloads. A first time location payload (e.g., Timeline-0) has the first set of association information P that matches the association information P for CSSCI-0, a second time location payload (e.g., Timeline-1) has the same first set of association information P that matches the association information P for CSSCI-0, a third time location payload (e.g., Timeline-2) has the same second set of association information P that matches the association information P for CSSCI-1. In this manner, CSSCI-0, Timeline-0; CSSCI-0, Timeline-1; and CSSCI-1, Timeline-2 are associated together as pairs having spanned watermarked information. This permits the same CSSCI type payload to be used for multiple different time location payloads.

As illustrated, each temporal location payload is associated with a previously received CSSCI type payload, and thus unidirectional in its association. In the event that a previous CSSCI type payload matching a temporal location payload is not available, then the system may be able to determine that a packet has been lost or otherwise the watermarking was not effective. The loss of watermarking data occurs with some frequency because the audio-video content tends to be modified by audio-video transcoding, such as to reduce the bitrate of the audio-video content.

Figure 8:
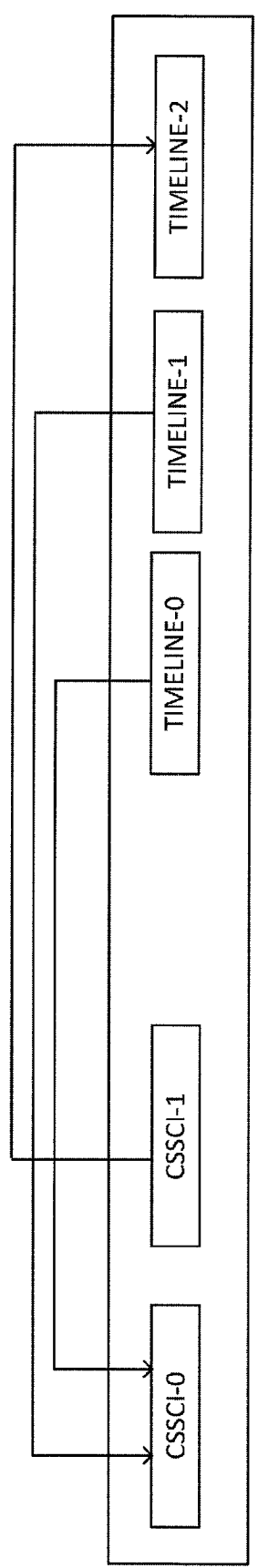
FIG. 8 illustrates relationships between watermark payloads.

Referring to FIG. 8, an exemplary time line is illustrated. A first CSSCI type payload (e.g., CSSCI-0) has a first set of association information P while a second CSSCI type payload (e.g., CSSCI-1) has a second different set of association information P. Having two different association information P for CSSCI-0 and CSSCI-1 distinguish between and identify the two CSSCI payloads. A first time location payload (e.g., Timeline-0) has the first set of association information P that matches the association information P for CSSCI-0, a second time location payload (e.g., Timeline-1) has the same first set of association information P that matches the association information P for CSSCI-0, a third time location payload (e.g., Timeline-2) has the same second set of association information P that matches the association information P for CSSCI-1. In this manner, CSSCI-0, Timeline-0; CSSCI-0, Timeline-1; and CSSCI-1, Timeline-2 are associated together as pairs having spanned watermarked information. This permits the same CSSCI type payload to be used for multiple different time location payloads. As illustrated, two of the temporal location payloads are associated with a previously received CSSCI type payload, and one of the CSSCI type payloads are associated with a subsequently received temporal location payload, and thus bidirectional in its association. In the event that a corresponding CSSCI type payload matching a temporal location payload is not available, then the system may be able to determine that a packet has been lost or otherwise the watermarking was not effective. Similarly, in the event that a corresponding timeline type payload matching a CSSCI payload is not available, then the system may be able to determine that a packet has been lost or otherwise the watermarking was not effective. The loss of watermarking data occurs with some frequency because the audio-video content tends to be modified by audio-video transcoding, such as to reduce the bitrate of the audio-video content.

In an example, a CSSCI type payload (e.g. CSSCI-0) has two sets of association information P0 and P1. A time location payload, e.g. Timeline-0, has two sets of association information P0 and P1 that matches the association information P0 and P1 for CSSCI-0. In this example a bidirectional association exists for the pair CSSCI-0, Timeline-0 where P0 points to CSSCI-0 and P1 points to Timeline-0.

The number of bits assigned to the payload identifier (P) may be modified, as desired (e.g., for a desired robustness). Similarly, the number of bits assigned to I, A, T, D, L, and R may be modified, as desired.

Figure 9:
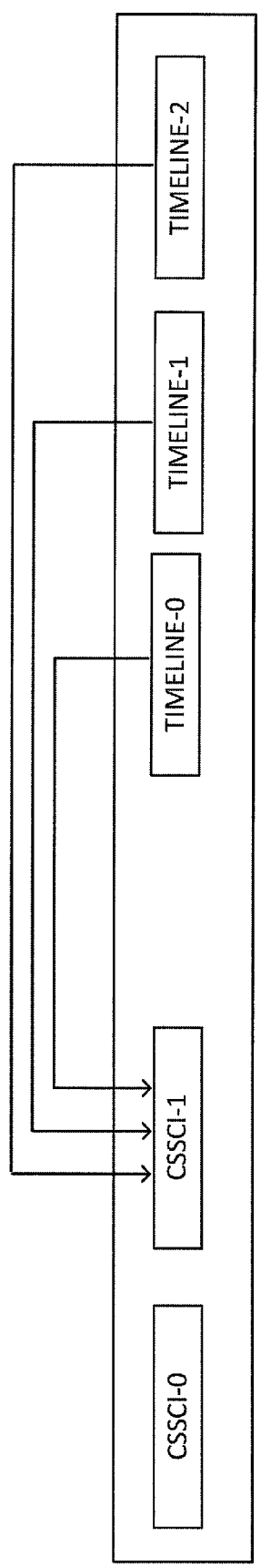
FIG. 9 illustrates relationships between watermark payloads.

In an example, the AV presentation device 180 may maintain a list, which may be denoted by a variable listC for example, of "c" most recently received CSSCI payload(s). "c" may be provided in the watermark, if desired, or otherwise set by the system. In this manner, the AV presentation device 180 may only have to maintain a limited number of CSSCI payloads in memory. In the case that c=1, then once a CSSCI payload is received it remains in effect until another CSSCI payload is received, as illustrated in FIG. 9. A loss of a CSSCI payload may be detected using the payload identifier (P); for example, the temporal location payload contains a P that does not correspond to any of the CSSCI payloads in listC. In this manner, the same user experience may be achieved across different AV presentation devices.

In an example, the AV presentation device 180 may maintain more than one list of received CSSCI payload(s). Each list may differ in size and may be maintained (i.e. addition/removal of entries within the list) using a differing set of rules. It is to be understood, that this does not preclude the possibility that a subset of lists may have same size and/or same maintenance rules. As an example, there may be two lists maintained by 180 where one list contains "c1" most recently received CSSCI payload(s) where each payload is received at an interval of "0" CSSCI payload(s); while the other list contains "c2" most recently received CSSCI payload(s), where each payload is received at an interval of "d" CSSCI payload(s).

Figure 10:
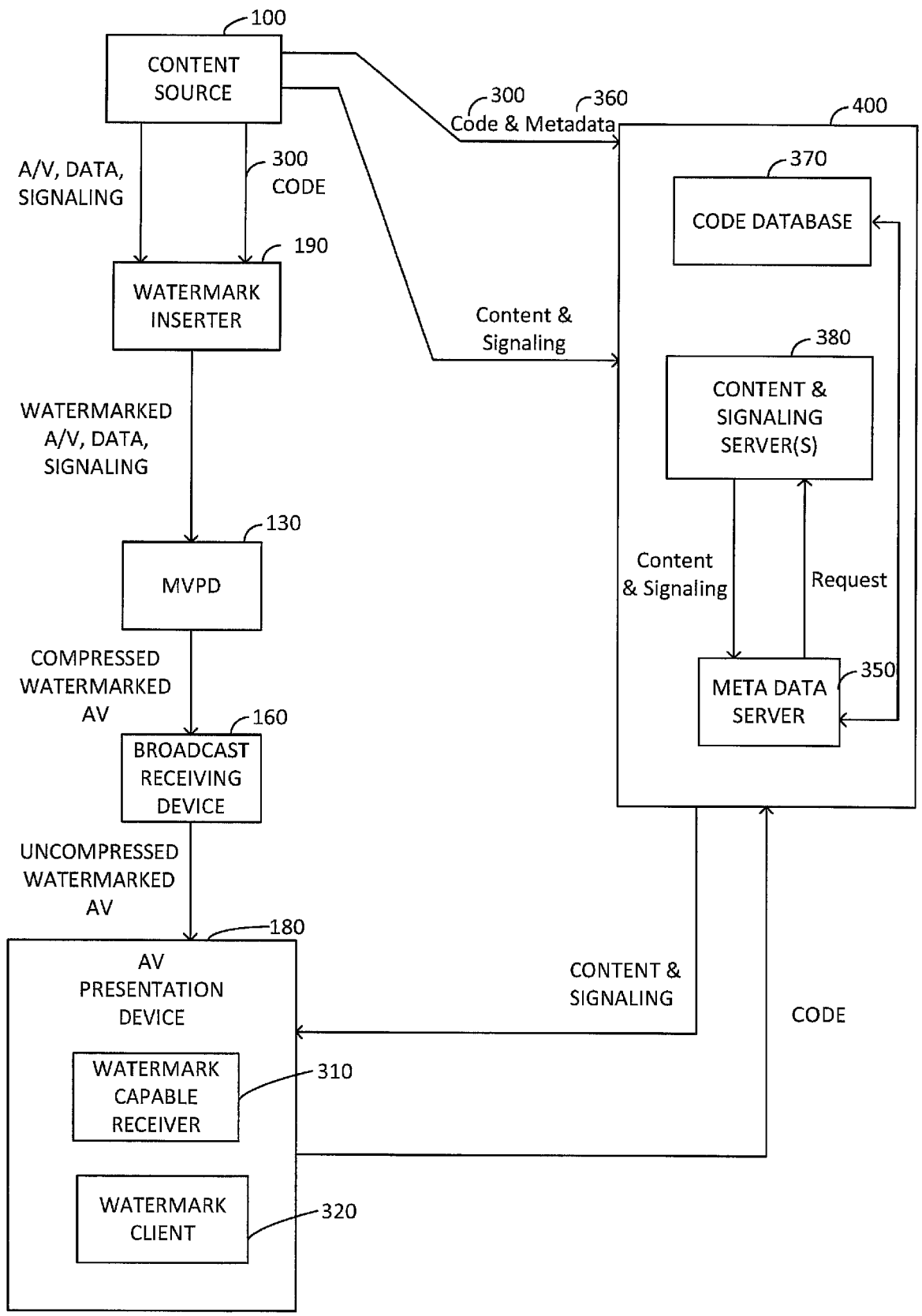
FIG. 10 illustrates another system with enhanced information.

Referring to FIG. 10, a modified system may include the content source 100, the watermark inserter 190, the MVPD 130, the broadcast receiving device 160, and the AV presentation device 180 together with its watermark capable receiver 310 and watermark client 320. The content server 400 may be modified to include the code database 370, the metadata server 350, and one or more of the content and signaling server 380. The code 300 and the metadata 360 is provided to the content server 400 by the content source 100. The content and signaling data is provided to the content and signaling server(s) 390.

The AV presentation device 180 may provide a code in a request based upon the decoded one or more watermarks from the audio-video broadcast. The content server 400 receives the request with the code from the AV presentation device 180. The metadata server 350 then parses the received code request and based upon information from the code database 370, makes a request to the content and signaling server(s) 390 to determine the content and signaling information which is then provided to the AV presentation device 180. In this manner, the AV presentation device 180 only needs to make a single request to a content server 400, which in turn provides the response to the AV presentation device 180. It is to be understood that the different functions of the content server 400 may be achieved by combining the existing functions together, separating the existing functions into more components, omitting components, and/or any other technique.

A HTTP/HTTPS request URL (that will be sent to the content server 400) corresponding to payload(s) in FIG. 5 and FIG. 6, when time sanative trigger D equals to 1, may be defined as:

If A is equal to 0 then the HTTP request URL is:
HTTP://IIIIIIII.IIIIIIII.IIIIIIII.IIIIIIII/
    LLLLLLLLL?time=TTTTTTTTTTTTTTTTT
    TTTTTTT
Otherwise, the HTTPS request URL is:
HTTPS://IIIIIIII.IIIIIIII.IIIIIIII/
    LLLLLLLLL?time=TTTTTTTTTTTTTTTTT
    TTTTTTTT
where IIIIIIII.IIIIIIII.IIIIIIII.IIIIIIII above corresponds to the 32-bit IP address signaled in CSSCI payload.

In an example, the subset of URL that specifies information such as: the content server location, the communication protocol, communication port, the login information, the folder on the content server are carried in a designated payload type.

In some implementations a syntax element's value may be derived using a decoding process which may access information spanning multiple payloads. For example, the time code may be fragmented into multiple watermark payloads and then reassembled to construct a complete time code. In an example, the time code may correspond to a temporal location within the AV content. In an example, the time code may correspond to timeline data of the AV content.

For example, the payload size may be 50 bits while the desirable metadata may be 66 bits, thus exceeding the payload size of a single watermark. An example of the desirable metadata may be as follows:

| | |
|---|---|
| location of content and server (I) | 32 bits (IP address) |
| application layer protocol (A) | 1 bit (HTTP/HTTPS) |
| time code (T) | 25 bits (for 1 year of uniqueness with a granularity of 1 second) |
| time sensitive trigger (D) | 1 bit |
| channel identification (L) | 5 bits |
| duration for content server requests (R) | 2 bits |

Another example of the desirable metadata may be as follows:

| | |
|---|---|
| location of content and server (I) | 32 bits (IP address) |
| application layer protocol (A) | 2 bit (00 = HTTP/01 = HTTPS, 10 = reserved, 11 = reserved) |
| time code (T) | 25 bits (for 1 year of uniqueness with a granularity of 1 second) |
| time sensitive trigger (D) | 1 bit |
| channel identification (L) | 5 bits |
| duration for content server requests (R) | 2 bits |

Figure 11:
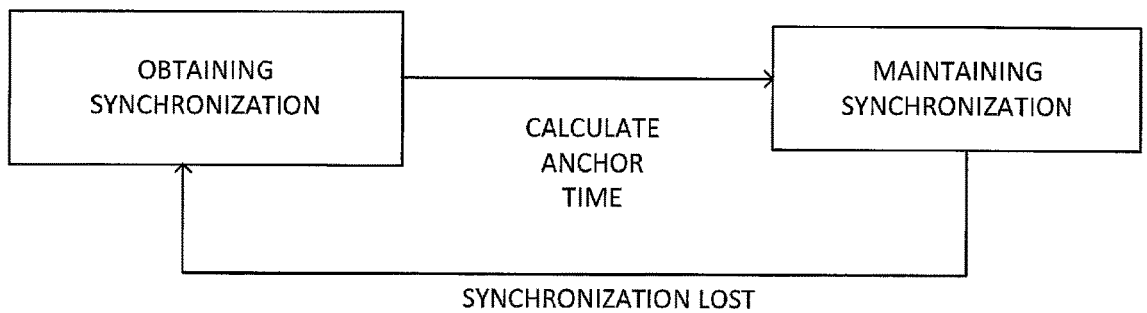
FIG. 11 illustrates obtaining synchronization and maintaining synchronization.

Referring to FIG. 11, a state transition diagram illustrates one technique to calculate the time code. To obtain a time code synchronization a number of consecutive payloads starting with a payload type "start sync", is followed by payloads of type "not start sync", with a total being equal to "r". By using the total of "r" consecutive payloads, each having some time information contained therein, the time synchronization may be determined by calculating an anchor time. After calculating the anchor time code, the time code may be updated by receiving additional payloads that include partial time code information therein in such a manner that does not require receiving another total of "r" consecutive payloads to determine the next time code. One technique to achieve this time synchronization is to partition the time code in consecutive payloads and an incremental time code in each of the consecutive payloads. When the synchronization is lost, such as by changing the channel, the obtain synchronization process is performed. A video display device when first initialized, or turned on, enters the initial obtaining synchronization state.

Figure 12:
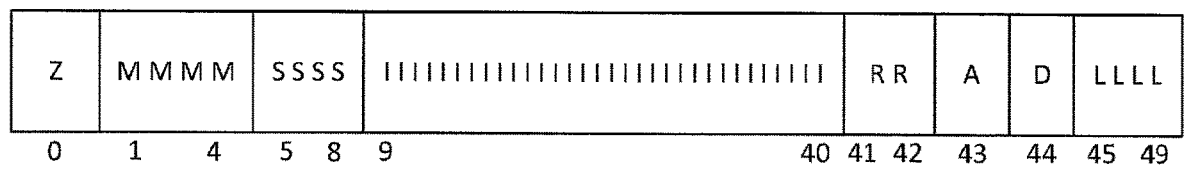
FIG. 12 illustrates another watermark payload.

Referring to FIG. 12, an exemplary structure of a watermark payload is illustrated. Z indicates the payload type, where Z equal to 1 indicates the start of the time sync and Z equal to 0 indicates not start of time sync. S indicates the time sync payload bits used in determining absolute time code. M indicates the time sync payloads bits used in maintaining the time code.

By way of example, the AV presentation device 180 may receive n=7 consecutive watermark payloads where the first payload has Z=1 while the rest have Z=0. The bits corresponding to "SSSS" are extracted from $(t-n+1)^{th}$ to $t^{th}$ watermark payload and concatenated together to obtain a 28 bit representation of the time code "$T_t$" of a temporal location. The anchor time code "$C_t$" is also set to "$T_t$". "$T_t$" may be represented as $SSSS_{z=1,t-n+1} \ldots SSSS_{z=0,t-1}SSS\ S_{z=0,t}$; "$C_t$"="$T_t$". In another example, constants may be added (to select a future time) and/or multiplied (to change the granularity) to the derived values. In an example, the derived values are mapped to another value by use of a mapping function.

Once the initialization synchronization is obtained, the anchor time and payload time are updated using each payload. This may be performed, for example, as follows:

$$T_t = f(C_{t-1}, MMMM_t)$$

$$C_t = g(T_t)$$

Where, f represents a mapping function that takes two values as input and outputs one value; g represents a mapping function that takes one value as input and outputs one value; / represents integer division with truncation of the result toward zero, For example, 7/4 and −7/−4 are truncated to 1 and −7/4 and 7/−4 are truncated to −1. In an example:

$$T_t = C_{t-1} + MMMM_t$$

$$C_t = T_t$$

As described above, every "n" payloads the anchor time may also be determined using the bits corresponding to "SSSS". The anchor time determined using "SSSS" must match the anchor time derivation above and can be used to verify the correctness of the maintained time code.

Since the watermark may span a non-zero time, the temporal location of the time code $T_t$ may be determined by a set of rules, such as for example, $T_t$ may correspond to a time instant at the end of the $t^{th}$ watermark payload.

It is to be understood that multiple syntax elements may be combined to form the code. The code may then be mapped either by the AV presentation device 180 or using another server to different syntax element values. For example, the server information (e.g., location of the content and signaling server(s) and/or application layer protocol, etc.) and time code is combined into a single code. The single code is then mapped to a temporal location in the uncompressed audio-video stream, and location of the content and signaling server(s). In this manner, a single request may be made to the server for additional information.

A limited number of bits may be used for the time code, in such a manner to permits collisions in the time code. For example, using 20 bits for the timecode allows for at most 12 days of uniqueness at a granularity of 1 second. After 12 days the code space corresponding to the timecode will be reused tending to result in collisions.

In an example the watermark payload may be encapsulated within a SDO private data command as SDO payload using one or more cmdIDs. As an example the watermark payload of FIG. 5 or FIG. 6 maybe encapsulated as SDO payload. A cmdID value 0x05 may refer to a watermark based interactive services trigger or a triggered declarative object (TDO) model. A cmdID value 0x06 may refer to a watermark based interactive services trigger (direct execution model). This facilitates the re-use of existing segmentation and reassembly modules built for trigger transportation. The segmented command may be embedded in watermarks, if desired. The SDO private data may be desired, such as illustrated in FIG. 13, where the packet is included as part of an SDO_payload( ). In some examples, the watermark payload received in this manner maybe passed to an entity/module in the receiver which handles these defined cmdID types. Then segmentation and reassembly functionality of that module could be reused if watermark payload packet needs to be split into multiple packets—depending upon the selected watermark scheme's capacity in terms of number of bits.

Parameter type T is a 2-bit field that indicates whether the instance of SDO private data, or SDOPrivateData, command is part of a segmented variable length command, and if so, whether the instance is the first, middle, or last segment of the segmented variable length command. In one example, SDOPrivateData is defined by the Consumer Electronics Association (CEA) in Section 7.1.11.2 of "CEA: "Digital Television (DTV) Closed Captioning, CEA-708-E, Consumer Electronics Association, June 2013" (CEA-708), and the type field in the SDO private data command is encoded as specified in Section 7.1.11.2 of CEA-708. pr is a flag that indicates, when set to '1', that the content of the command is asserted to be program related. When the flag is set to '0', the content of the command is not so asserted. Length (L) is an unsigned integer that indicates the number of bytes following the header, in the range of 2 to 27, and is represented in the SDO private data command as the set of bits $L_4$ through $L_0$ where $L_4$ is the most significant and $L_0$ is the least significant. cmdID is a signal that identifies the SDO that has defined the syntax and semantics of the SDO_payload( ) data structure to follow. In an example, cmdID is an 8-bit field. The metadata may be encapsulated within SDO private data as SDO payload using one or more cmdIDs as shown in FIG. 14.

The payload defined in FIG. 5 and FIG. 6 may be encapsulated within a SDO private data command as SDO payload using one or more cmdIDs. A cmdID value 0x05 and 0x06 may refer to encapsulation of payloads defined in FIG. 5 and FIG. 6 respectively. This facilitates the re-use of existing segmentation and reassembly modules built for trigger transportation. The segmented command may be embedded in watermarks, if desired. The SDO private data may be desired, such as illustrated in FIG. 13, where the payload packet is included as part of SDO_payload( ).

The payload defined in FIG. 12 may be encapsulated within a SDO private data command as SDO payload using one or more cmdIDs. A cmdID value 0x05 may refer to encapsulation of payload defined in FIG. 12. This facilitates the re-use of existing segmentation and reassembly modules built for trigger transportation. The segmented command may be embedded in watermarks, if desired. The SDO private data may be desired, such as illustrated in FIG. 13, where the packet is included as part of SDO_payload( ).

An example of a watermark associated information retrieval system is described next.

The system consists of a watermark detector, an AV presentation device, a watermark information server. In one example, the watermark detector may reside inside an AV presentation device. In one example, the AV presentation device may be a AV presentation device 180. In one example, the watermark information server may be an enhanced service information providing server 140.

In one example, the watermark detector may detect and decode the watermark. The watermark may be an audio watermark. The watermark detector and/or AV presentation device may use the information in the watermark to identify a timeline location of the media content in which the watermark is embedded and/or an address (e.g. IP address) of a server that can be concatenated to obtain further information associated with the watermark. In an example, this may be necessary as the watermark payload capacity may be only a few bits. For example the capacity may be 50 bits over a time period of 1 second or 1.5 seconds or 2 seconds. In this case the AV presentation device may contact a watermark information server to obtain more information about the current timeline location for the current media. The watermark server may send "watermark associated information" as a response to this request.

JavaScript Object Notation (JSON) is a data interchange format.

JSON schema defines a JSON based format for defining the structure of JSON data. JSON schema is intended to define validation, documentation, hyperlink navigation, and interaction control of JSON data.

An object is an unordered collection of zero or more name and value pairs, where a name is a string and a value is a string, number, Boolean, null, object, or array.

A JSON schema is a JSON document, which must be an object. Object properties defined by JSON schema are called keywords or schema keywords.

A JSON schema may contain properties which are not schema keywords.

A JSON value may be an object, array, number, string, or one of false, null, or true.

The terms key and keyword and name may be used interchangeably in this document. The term key may be used to refer the name of an object in this document.

FIG. 15 shows an exemplary JSON schema for watermark associated information. With respect to FIG. 15 the following should be noted.

Instead of using XML to represent the watermark associated information retrieved, JSON may be used. In this case instead of using elements (e.g. XML elements) and attributes (XML attributes), JSON objects are used with their properties.

Entertainment identifier register (EIDR) is a universal identifier system for movie and television assets. From top level titles, edits, and DVDs, to encodings, clips and mashups, EIDR provides global identifiers for the entire range of audiovisual object types that are relevant to entertainment commerce. EIDR format described at HTTP://eidr.org/documents/EIDR_ID_Format_v1.2.pdf and is incorporated herein by reference.

Ad-ID, or AD-ID, is an industry standard for identifying advertising assets across media platforms. Ad-ID code structure as shown in HTTP://www.Ad-ID.org/how-it-works/Ad-ID-structure and is incorporated herein by reference.

With respect to FIG. 15 a regular expression based syntax is defined in JSON schema for EIDR and Ad-ID information inclusion in the ContentID event. In contrast to using a string, this formal syntax enforces that only valid values could be signaled for EIDR and Ad-ID.

This is illustrated in the extracted part of the JSON schema from FIG. 15 below:

```
"ContentID": {
    "type": "object",
        "properties": {
            "oneOf": [ {"Type": {"type": "string", "enum":
                ["EIDR"]}, "CID": {"type": "string", "pattern":
"^10\\.5240\\/([0-9a-fA-F]{4}-){5}[0-9A-Z]$", "minLength": 34,
                "maxLength": 34}}, {"Type": {"type": "string", "enum":
                ["AD-ID"]}, "CID": {"type": "string", "pattern":
"^[1-9a-zA-Z]{1}[0-9a-zA-Z]{10}(H|D)?$", "minLength": 11,
"maxLength": 12}}
            ]
        }
    },
```

In this schema with the use of regular expression based "pattern", the string included as a value for the CID, or ContentID, key for an EIDR type is by design always a valid EIDR string. In this schema with the use of regular expression based pattern the string included for the CID key for an AD-ID type is by design always a valid Ad-ID string. As a result invalid EIDR and Ad-ID strings cannot be sent from the watermark server in the JSON data.

Further with respect to FIG. 15, an enumerated data type is defined for the ContentID type instead of a general purpose string. This restricts the value to only valid values. As a result it is not possible to define an invalid value for ContentID type. This can be seen in the use of "enum": ["EIDR"] and "enum": ["AD-ID"] values defined for the respective Type (or type) strings inside the ContentID object in the schema in FIG. 15. As a result invalid ContentID type values could be defined and returned.

Further with respect to FIG. 15, an extension mechanism is defined for trigger events represented by a trigger key in FIG. 15 to return one or more of a universal resource indicator (URI) event type other than a currently defined URI types in the future. The extended URI types are defined with a designated prefix. This is illustrated in the extracted part of the JSON schema from FIG. 15 below. In an example, the JSON schema includes an application information table (AIT), a media presentation description (MPD), and/or an electronic service guide (ESG) value.

```
"Trigger": {
    "type": "object",
    "properties": {
        "Trigger": {"type": "string", "format": "uri"},
        "Version": {"type": "integer"},
        "UriType": {"type": "string",
            "oneOf": [ {"enum": ["AIT", "MPD","ESG"]},
                {"pattern": "^EXT"}
            ]},
        "required": ["Trigger","UriType"]
    }
},
```

It can be seen that trigger types, such as AIT, MPD, and ESG, are defined as valid string values. This is represented by the "enum": ["AIT", "MPD", "ESG"] for the UriType string. In the future other valid trigger types may be defined. This is accomplished by allowing use of other string values for UriType. In an example, these strings may start with a prefix of EXT. This behavior is defined by the use of "oneOf" constraint for the UriType string as follows:

```
"UriType": {"type": "string",
    "oneOf": [ {"enum": ["AIT", "MPD","ESG"]},
        {"pattern": "^EXT"}
    ]},
```

The defined prefix above is denoted as EXT, which means that an extension UriType must start with the characters EXT. Other characters could instead be used. For example instead of EXT, the strings FUT, NEXT or any other suitable string may be used.

In an example, a future UriType may be allowed to be any valid string in which case the relevant part of the schema may be defined as:

```
"UriType": {"type": "string",
    "oneOf": [ {"enum": ["AIT", "MPD","ESG"]},
        {"pattern": ".+"}
    ]},
```

In another example, additional overall extensions of the schema shown in FIG. 15 and FIGS. 16A-C are supported for future extensibility. In another example, to allow future extensibility the JSON schema may be defined with key, value pair of additionalProperties: true.

For example the last 4 lines of the JSON schema of may be replaced with following:

```
"required": ["TimeAnchor","IntervalCodeAnchor","Event"],
"additionalProperties": true
}
}
```

This allows defining additional objects and types with properties inside the returned JSON data.

FIGS. 16A-C shows a logical structure of JSON schema for watermark associated information retrieval. The FIGS. 16A-C structure corresponds to FIG. 15 JSON schema. However some or part of the logical structure may be manifested with variant JSON schema.

In an example, the watermark associated information returned via JSON schema illustrated in FIG. 15 and/or FIGS. 16A-C from a watermark server may be a recovery file format.

In another example, instead of using JSON to represent the watermark associated information returned from the watermark server XML format may be used for it. A few enhancements and ways of returning XML format data from watermark server and conformance with defined XML schema is described next.

In an example, a pattern based syntax using XML is defined for one or more of a EIDR and an Ad-Id information inclusion in the ContentID event. In contrast to using a general purpose xs:String data type, this formal syntax enforces that only valid values could be signaled for EIDR and AD-ID.

In an example, the XML schema for EIDR information inclusion is:

```
<xs:simpleType name="CID">
    <xs:restriction base="xs:token">
        <xs:pattern value="(10\.5240/([0-9a-fA-F]{4}-){5}[0-9A-Z])"/>
    </xs:restriction>
</xs:simpleType>
```

In an example, the XML schema for Ad-ID information inclusion is:

```
<xs:simpleType name="CID">
    <xs:restriction base="xs:token">
        <xs:patternvalue="([1-9a-zA-Z]{1}[0-9a-zA-Z]{10}(H|D)?)"/>
    </xs:restriction>
</xs:simpleType>
```

A combined XML schema for EIDR or Ad-ID inclusion is as shown below:

```
<xs:simpleType name="CID">
    <xs:restriction base="xs:token">
        <xs:pattern value="([1-9a-zA-Z]{1}[0-9a-zA-Z]{10}(H|D)?)|(10\.5240/([0-9a-fA-F]{4}-){5}[0-9A-Z])"/>
    </xs:restriction>
</xs:simpleType>
```

In another example, an enumerated data type is defined for the type of ContentID, or ContentIDType, instead of a general purpose string. This restricts the value to only valid values.

In an example, the XML schema for this is:

```
<xs:simpleType name="ContentIDType">
    <xs:restriction base="xs:string">
        <xs:enumeration value="EIDR" />
        <xs:enumeration value="Ad-ID" />
        <xs:enumeration value="EXT" />
    </xs:restriction>
</xs:simpleType>
```

The overall XML schema for ContentID event with inclusion of constrained type and contentID attributes is as shown below:

```
<xs:element name="ContentID">
    <xs:complexType>
        <xs:attribute name="type" type="ContentIDType"/>
        <xs:attribute name="contentID" type="CID"/>
    </xs:complexType>
</xs:element>
```

Another example of using XML schema is described next.

The above XML schema definitions allows defining a ContentID event with type equal to Ad-ID but the ContentID value defined for EIDR identifier.

Similarly the above XML schema definitions allow defining a ContentID event with type equal to EIDR but the ContentID value defined for Ad-ID identifier.

To prevent this definition, the XML schema may be defined as follows.

```
<xs:simpleType name="ContentIDType1">
 <xs:restriction base="xs:string">
  <xs:enumeration value="EIDR" />
 </xs:restriction>
</xs:simpleType>
<xs:simpleType name="ContentIDType2">
 <xs:restriction base="xs:string">
  <xs:enumeration value="Ad-ID" />
 </xs:restriction>
</xs:simpleType>
<xs:simpleType name="CIDToken1">
 <xs:restriction base="xs:token">
  <xs:pattern value="10\.5240/([0-9a-fA-F]{4}-){5}[0-9A-Z]"/>
 </xs:restriction>
</xs:simpleType>
<xs:simpleType name="CIDToken2">
 <xs:restriction base="xs:token">
  <xs:pattern value="[1-9a-zA-Z]{1}[0-9a-zA-Z]{10}(H|D)?"/>
 </xs:restriction>
</xs:simpleType>
        <xs:element name="ContentID">
            <xs:complexType>
                <xs:choice>
                <xs:sequence>
                <xs:element name="CID1">
                    <xs:complexType>
                        <xs:attribute name="type" type="ContentIDType1"/>
                        <xs:attribute name="contentID" type="CIDToken1"/>
                    </xs:complexType>
                </xs:element>
                </xs:sequence>
                <xs:sequence>
                <xs:element name="CID2">
                    <xs:complexType>
                        <xs:attribute name="type" type="ContentIDType2"/>
                        <xs:attribute name="contentID" type="CIDToken2"/>
                    </xs:complexType>
                </xs:element>
```

-continued

```
                </xs:sequence>
                </xs:choice>
            </xs:complexType>
        </xs:element>
```

This XML schema strictly enforces that ContentID value can only be a valid Ad-ID identifier value when ContentID event has type equal to Ad-ID. Also the XML schema enforces that ContentID value can only be a valid EIDR identifier value when ContentID event has type equal to EIDR.

Cardinality of query spread attribute is modified from 0 . . . N to 0 . . . 1. Signaling multiple query spread values can result in confusing receiver behavior thus at most only 1 value of query spread is signaled.

In an example, the XML schema for this is:

```
<xs:element name="RecoveryData">
    <xs:complexType>
        <xs:attribute name="querySpread" type="xs:string" use="optional"/>
    </xs:complexType>
</xs:element>
```

An extension element is defined for future extensions. A RecoveryExt element of the type "RecoveryExtType" is defined to allow defining proprietary extensions of the watermark associated information.

In an example, the following XML schema may be defined for this.

The extension element may be defined as a child element of the overall root element or at any other suitable place in the overall XML schema as follows:

```
<xs:element name="RecoveryExt" type="RecoveryExtType" minOccurs="0"/>
```

In an example, the XML data type for the extension element RecoveryExtType is:

```
<xs:complexType name="RecoveryExtType">
    <xs:sequence>
        <xs:annotation>
            <xs:documentation>
```

Proprietary extensions of recovery file format. It is a requirement that different namespace shall be used for proprietary extensions.

```
        </xs:documentation>
        </xs:annotation>
        <xs:any namespace="##other" processContents="skip" minOccurs="0" maxOccurs="unbounded"/>
    </xs:sequence>
</xs:complexType>
```

Additional examples are now described for JSON schema to make the schema extensible.

An additional JSON schema for watermark associated information retrieval is shown in FIG. 17. In the schema support is included for extensibility of JSON schema for extensibility.

In the JSON schema in FIG. 17 compared to JSON schema in FIG. 15, the following is included for extensibility:

(1) A top level key, such as RecoveryFF is defined and the current recovery file format schema in FIG. 17 is defined as an object for this top level key. Thus, the schema in FIG. 15 may be wrapped inside the top level key. This allows extensibility for the current recovery file format by use of "allOf" and "$ref" keywords of a JSON schema.

The JSON keyword "allOf" is defined in HTTP://tools.ietf.org/html/draft-fge-json-Schema-validation-00 which is incorporated here by reference. In an example, "allOf" defines that the given data must be valid against all schema defined by a keyword value. In an example, to validate against "allOf", the given data must be valid against all schemas defined by this keyword's value.

Part of a schema may be referred to using the $ref keyword. $ref gets logically replaced with the schema part that it points to.

(2) Keys are made unique. Thus none of the keys, even if they belong to different objects, have the same key name. This facilitates extensibility.

One example of doing an extension is when a second version of a recovery file format is defined. In this case the new key and value pairs may be added to a schema, while keeping the old key value pairs for backward compatibility with the schema in FIG. 17.

When extending the JSON schema in FIG. 17, the following type of new key may be defined:

```
"RecoveryFFV2": {
    "type": "object",
    "properties": {
        "V2": {"allOf": [
            {"$ref": "#/RecoveryFF"},
            {
                "properties": {
                    "newkeyA": "valueA",
                    "newkeyB": "valueB"
                },
                "required": ["newkeyA"]
            }
        ]}
    }
}
```

In an example, the new key is the "RecoveryFFV2" key.

In this case with the use of allOf keyword the data must be valid against all of the given schemas.

The first schema included inside allOf keyword is {"$ref": "#/RecoveryFF"}, which refers to the schema for first version of recovery file format as shown in FIG. 17. The new keys and values for schema for the second version of recovery file format are then included as:

```
{
    "properties": {
        "newkeyA": "valueA",
        "newkeyB": "valueB"
    },
    "required": ["newkeyA"]
}
```

Thus the overall example schema for second version of recovery file format is as shown in FIG. 18.

A second example for providing an extensible schema is illustrated below. In this example, a JSON for Linked Data (JSON-LD) based extension mechanism is defined by inclusion of a @context keyword. JSON-LD is a format to serialize linked data. The JSON-LD syntax is designed to integrate into systems that already use JSON and provides an upgrade path from JSON to JSON-LD. JSON-LD is primarily intended to be a way to use linked data in web-based programming environments, to build interoperable web services, and to store linked data in JSON-based storage engines. Linked data is a way to create a network of standards-based machine interpretable data across different documents and web sites. It allows an application to start at one piece of linked data and follow embedded links to other pieces of linked data that are hosted on different sites.

FIG. 19 shows an example of a JSON schema for a watermark associated information retrieval.

In the JSON schema in FIG. 19, compared to the JSON schema in FIG. 15, the following is added for extensibility:

(1) A key (@context) is defined and the current recovery file format schema in FIG. 19 is included as "RecoveryFF": HTTP://www.atsc.org/contexts/3.0/RecoveryFF inside the key (@context). The schema is then wrapped inside the key "RecoveryFF".

(2) Keys are made unique, in that keys do not have the same key name, even if they below to different objects. This facilitates extensibility.

One example of enabling an extension is defining a second version of the recovery file format. In this example, the new key and value pairs will be added to a schema, while keeping the old key value pairs for backward compatibility with the schema in FIG. 19.

When enabling an extension of the JSON schema in FIG. 19, a @context can be included for the new keys and values as:

```
"@context":
{
    "RecoveryFF2":
    "HTTP://www.atsc.org/contexts/3.1/RecoveryFF"
},
"RecoveryFF2": {
    "type": "object",
    "properties": {
        "newkeyA": "valueA",
        "newkeyB": "valueB"
    },
    "required": ["newkeyA"]
}
```

The new key in this case is "RecoveryFF2".

The new "@context" for the new key "RecoveryFF2" is "RecoveryFF2": "HTTP://www.atsc.org/contexts/3.1/RecoveryFF"

In an example, the new keys and values for the schema for the second version of recovery file format are then:

```
"RecoveryFF2": {
    "type": "object",
    "properties": {
        "newkeyA": "valueA",
        "newkeyB": "valueB"
    },
    "required": ["newkeyA"]
}
```

The overall example schema for second version of recovery file format is shown in FIG. 20.

In an example, when doing an extension a second version of recovery file format is defined, only one new @context may be included for old and new keys and values as follows.

```
"@context":
{
    "RecoveryFF":
        "HTTP://www.atsc.org/contexts/3.1/RecoveryFF"
},
```

In this example, the new keys and values for this second version of recovery file format are:

```
"newkeyA": "valueA",
"newkeyB": "valueB",
``` which may be included with other keys and values in the previous version of the schema in FIG. 19.

Thus, in this example, by changing the value of the "RecoveryFF" key inside "@context", the new and old keys and values may be included together as shown in FIG. 21.

Thus the overall schema for a recovery file format is as shown in FIG. 21.

In other examples that prevent changing the schema with respect to FIG. 17, FIG. 18, FIG. 19, FIG. 20, FIG. 21 further extensibility the JSON schema may be defined with additionalProperties: false.

Moreover, each functional block or various features of the base station device and the terminal device (the video decoder and the video encoder) used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array signal (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method of processing a data stream, the method comprising:
    requesting a recovery file by using a recovery uniform resource locator; receiving the recovery file that is a JavaScript Object Notation document, the recovery file including a content identifier element including (a) a type field representing a content identifier type, and (b) a content identification field representing an encoded identifier value; and
    selectively extracting the content identifier element from the recovery file, wherein for the type field, two values (i) and (ii) are defined:
    (i) a first value indicating an entertainment industry data registry (EIDR) identification for an EIDR registry, and
    (ii) a second value indicating an advertising identifier (AD-ID) that identifies advertising assets of an AD-ID registry, and the content identification field is a canonical form defined according to a format, which is an EIDR format or an AD-ID format.

2. A receiver for processing a data stream, the receiver comprising:
    a processor; and
    a memory connected to the processor, wherein the processor is configured to perform steps of:
    requesting a recovery file by using a recovery uniform resource locator;
    receiving the recovery file that is a JavaScript Object Notation document, the recovery file including a content identifier element including: (a) a type field representing a content identifier type, and (b) a content identification field representing an encoded identifier value;
    and selectively extracting the content identifier element from the recovery file, wherein for the type field, two values (i) and (ii) are defined:
    (i) a first value indicating an entertainment industry data registry (EIDR) identification for an EIDR registry, and
    (ii) a second value indicating an advertising identifier (AD-ID) that identifies advertising assets of an AD-ID registry, and
    the content identification field is a canonical form defined according to a format, which is an EIDR format or an AD-ID format.

* * * * *